(12) United States Patent
Howard et al.

(10) Patent No.: US 6,427,942 B2
(45) Date of Patent: Aug. 6, 2002

(54) STIFFNESS DE-COUPLED SKID LANDING GEAR

(75) Inventors: John V. Howard, Arlington; Ramesh Thiagarajan, Plano; Michael R. Smith, Colleyville; Ashish K. Sareen, Euless, all of TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 09/877,428

(22) Filed: Jun. 8, 2001

Related U.S. Application Data

(63) Continuation of application No. 09/314,399, filed on May 19, 1999, now Pat. No. 6,244,538.

(51) Int. Cl.[7] .............................................. B64C 25/52
(52) U.S. Cl. ............................. 244/17.17; 244/104 R; 244/108
(58) Field of Search ....................... 244/100 R, 104 R, 244/104 LS, 104 CS, 108, 109, 17.17, 104 FP

(56) References Cited

U.S. PATENT DOCUMENTS

| | | | | |
|---|---|---|---|---|
| 3,716,208 A | * | 2/1973 | Fagan et al. ............... | 244/108 |
| 3,888,436 A | * | 6/1975 | Sealey ................... | 244/104 FP |
| 4,196,878 A | * | 4/1980 | Michel .................... | 244/108 |
| 4,270,711 A | * | 6/1981 | Cresap et al. ............. | 244/17.17 |
| 4,284,255 A | * | 8/1981 | Masclet et al. ........... | 244/102 R |
| 4,519,559 A | * | 5/1985 | Logan et al. ............. | 244/17.17 |
| 4,558,837 A | * | 12/1985 | Mens et al. ................ | 244/108 |
| 4,645,143 A | * | 2/1987 | Coffy ....................... | 244/100 |
| 5,211,359 A | * | 5/1993 | Rene et al. ................ | 244/108 |
| 5,224,669 A | * | 7/1993 | Guimbal ................... | 244/108 |
| 5,462,242 A | * | 10/1995 | Collins et al. ............. | 244/108 |
| 5,735,484 A | * | 4/1998 | Bradley ..................... | 244/108 |

\* cited by examiner

*Primary Examiner*—Galen L. Barefoot
(74) *Attorney, Agent, or Firm*—James E. Walton; Hill & Hunn, LLP

(57) ABSTRACT

A skid landing gear for a helicopter, in which the directional stiffnesses of the cross members of the skid landing gear have been de-coupled from one another, such that optimization of the longitudinal stiffniess of the cross members may be performed independently of the optimization of the vertical stiffniess and fatigue life of the cross members. In order to de-couple the stiffnesses in the skid type landing gear, two approaches are employed. In the first approach, the skid landing gear has non-symmetric-section cross members and/or distribution of different materials within the cross-section for de-coupling the vertical stiffness of the cross members from the longitudinal stiffness, such that placement of the ground resonance frequency may be optimized, while retaining the vertical stiffness properties essential for optimizing vertical energy attenuation and fatigue life. In the second approach, mounting devices are employed that provide compliance in selected directions, thereby de-coupling the directional stiffnesses.

64 Claims, 14 Drawing Sheets

(a.)

$I_{xx}$ = 6.124 in⁴
$I_{yy}$ = 1.657 in⁴
$EI_{xx}$ = 64300 K-in²
$EI_{yy}$ = 17400 K-in²

(b.)

$I_{xx}$ = 5.238 in⁴
$I_{yy}$ = 1.705 in⁴
$EI_{xx}$ = 55000 K-in²
$EI_{yy}$ = 17900 K-in²

(c.)

$I_{xx}$ = 6.410 in⁴
$I_{yy}$ = 1.933 in⁴
$EI_{xx}$ = 67300 K-in²
$EI_{yy}$ = 20300 K-in²

(d.)

$I_{xx}$ = 5.295 in⁴
$I_{yy}$ = 1.143 in⁴
$EI_{xx}$ = 55600 K-in²
$EI_{yy}$ = 12000 K-in²

NLT Natural Frequencies With Skid Gear on Ground
| Angle of Link (deg) | Natural Frequencies | | | | |
|---|---|---|---|---|---|
| | Lat/Yaw (Hz) | F/A (Hz) | Roll/Lat (Hz) | Pitch (Hz) | Vertical (Hz) |
| -45 | - | 1.51 | 1.80 | 3.94 | 5.58 |
| -30 | 5.80 | 1.51 | 1.89 | 3.94 | 5.58 |
| -20 | 4.08 | 1.51 | 2.01 | 3.94 | 5.58 |
| -15 | 3.02 | 1.51 | 2.09 | 3.94 | 5.58 |
| -10 | 2.04 | 1.51 | 2.27 | 3.94 | 5.58 |
| -5 | 1.48 | 1.51 | 2.37 | 3.94 | 5.58 |
| 0 | 1.22 | 1.51 | 2.56 | 3.94 | 5.58 |
| 1 | 1.20 | 1.51 | 2.60 | 3.94 | 5.58 |
| 2.5 | 1.18 | 1.51 | 2.66 | 3.93 | 5.58 |
| 5 | 1.18 | 1.51 | 2.77 | 3.93 | 5.58 |
| 10 | 1.23 | 1.51 | 2.99 | 3.93 | 5.58 |
| 15 | 1.29 | 1.51 | 3.20 | 3.93 | 5.58 |
| 20 | 1.34 | 1.51 | 3.40 | 3.93 | 5.58 |
| 30 | 1.44 | 1.51 | 3.75 | 3.93 | 5.58 |
| 45 | 1.52 | 1.51 | 4.15 | 3.93 | 5.58 |
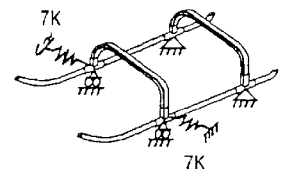
Fig. 8A
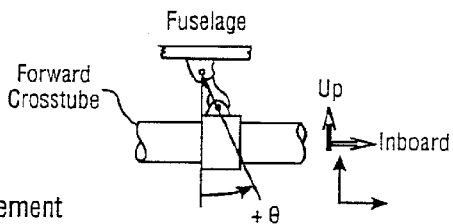
Aft Crosstube Attachments are "clamped"
(with no moment transfer across joint)
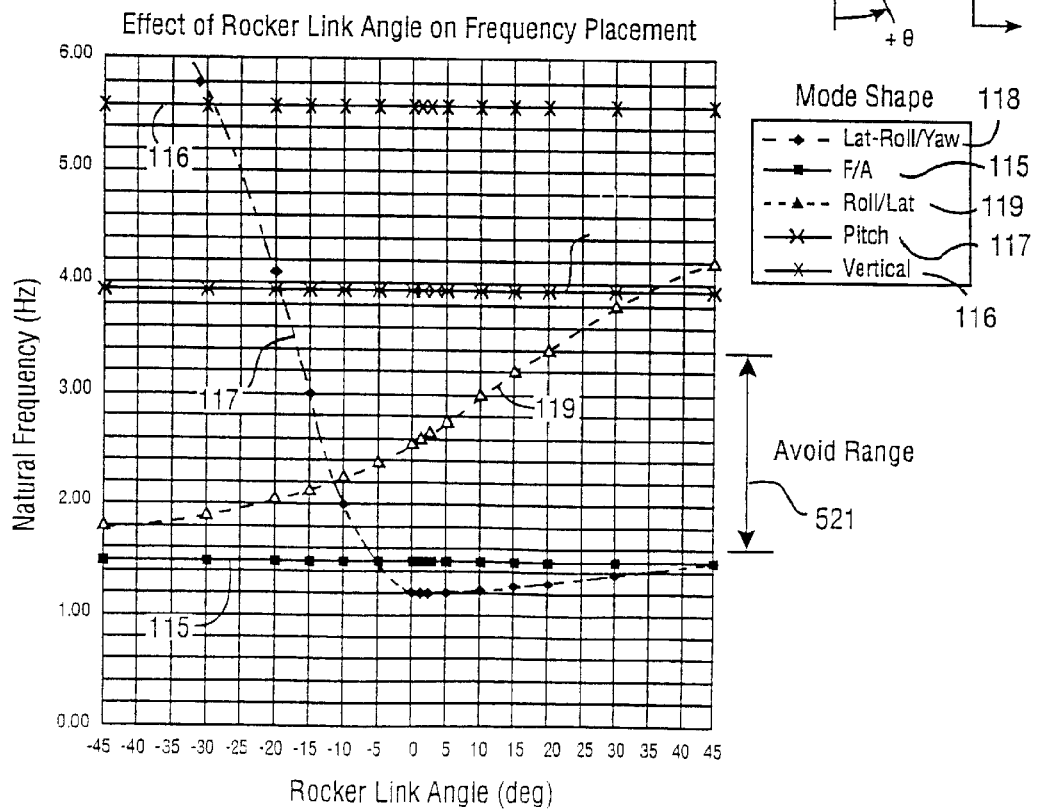
Fig. 8B

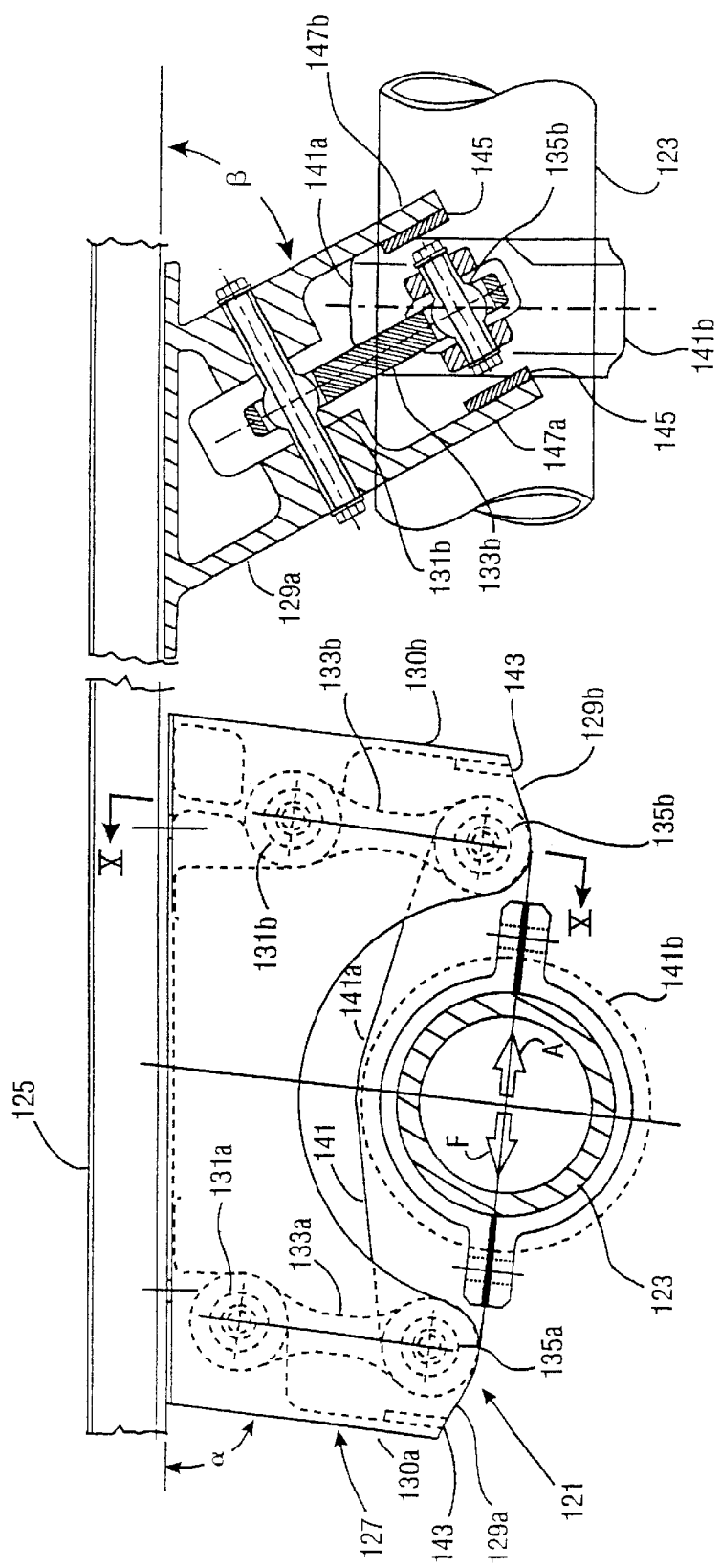

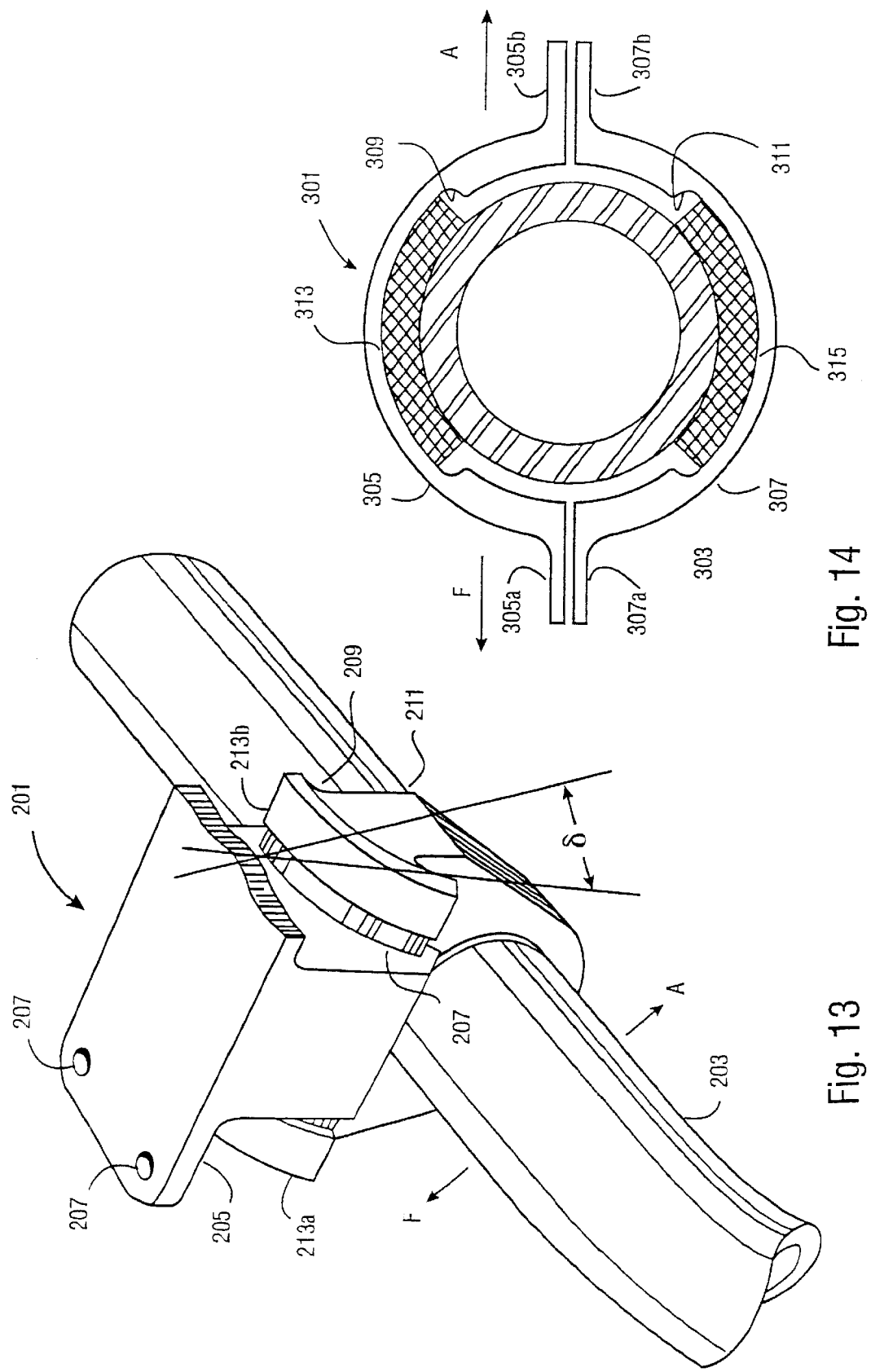

Note: Higher Vertical Stiffness of Non-Symmetric Cross Member Reduces Applied Stresses During Normal Landings for Improved Fatigue Life Influencing Directional Stiffness for Fore and Aft Shuffle Mode of Ground Resonance

STIFFNESS DE-COUPLED SKID LANDING GEAR

This is a continuation of Ser. No. 09/314,399 filed May 19, 1999, now U.S. Pat. No. 6,244,538.

BACKGROUND ART

1. Field of the Invention

The present invention relates generally to aircraft skid landing gear having a various directional stiffnesses. More specifically, the present invention relates to a skid landing gear assembly for a helicopter in which the vertical stiffniess is de-coupled from the longitudinal stiffniess.

2. Description of Related Art

Helicopter skid landing gear devices are well known in the art. For instance, most modern helicopters feature a skid landing gear having a pair of circular-section cross members attached to a pair of longitudinal skids. These circular-section cross members are designed to optimize the attenuation of the vertical energy of hard landings and to maximize fatigue life. However, with these circular-section cross members, the vertical stiffness is inherently coupled to the longitudinal stiffnesses, resulting in relatively high longitudinal stiffnesses. It is well known in the art that some of the rotor blade's rotational energy is transformed to oscillatory energy of the fuselage and of the rotor blade in the in-plane mode. This phenomenon is known as ground resonance. Ground resonance is destabilizing and requires adequate system damping in the fuselage and skids and in the rotor blade's lead-lag dampers. When the system damping is less than or equal to zero, there is a potential for instability. A high longitudinal stiffness generally has an adverse affect on shuffle mode ground resonance frequency placement, creating a direct conflict between energy attenuation and fatigue life requirements and ground resonance frequency placement. In order to resolve this conflict, prior-art skid landing gear designers have resorted to heavy and costly add-on devices, such as rocker beams, dampers, and skid springs.

For example, U.S. Pat. No. 4,270,711 to Cresap et al. discloses a helicopter skid landing gear with cross tube pivot. Cresap et al. employs a structural beam, or rocker beam, that allows central pivoting of the aft cross tube, creating a three-point support for reducing roll frequency. Cresap et al. has only an indirect affect on the longitudinal shuffle frequency. Thus, Cresap et al. is limited in its ability to tune the skid gear for both attenuating vertical landing energy, and avoiding ground resonance frequency. The Cresap et al. device is costly, complicated, and heavy. In addition, it is difficult-to design the centrally pivoted aft cross tube for adequate fatigue life.

Another example is U.S. Pat. No. 5,211,359 to Rene et al., which discloses a landing gear for aerodynes with cross pieces made of composite material. The Rene et al. device features a skid gear with laminated fiberglass cross members. Although it is generally believed that energy absorption cannot occur elastically, Rene et al. discloses an elastic energy absorption capacity that is superior to metallic devices. Although Rene et al. discloses the use of dampers to control ground resonance, there is no mention of how the dampers are tuned for ground resonance frequency placement. Rene et al. does not disclose the use of its laminated cross member section properties to obtain compliance to avoid ground resonance.

Another example of a helicopter skid landing gear is disclosed in U.S. Pat. No. 5,224,669 to Guimbal. The Guimbal device features laminated cross members made in the shape of an arch. Guimbal capitalizes upon the non-linear geometry of the arches and friction to obtain vertical energy absorption for light helicopters. Although Guimbal discloses the use of dampers to control the ground resonance, it makes no mention of how to tune the system properties for ground resonance stability.

Although these prior-art devices teach various methods of absorbing the vertical energy of landing, they do not adequately address the problem of helicopter ground resonance frequency placement. Despite these advances in the art, there continues to be a need for a helicopter skid landing gear that addresses not only vertical energy attenuation and fatigue life, but that also adequately addresses the problem of controlling the ground resonance frequency.

BRIEF SUMMARY OF THE INVENTION

There is a need for a helicopter having an improved skid landing gear in which the directional stiffnesses of the cross members are de-coupled so that the ground resonance frequency placement of the gear and its vertical energy attenuation and fatigue characteristics can be optimized independently.

It is an objective of the present invention to provide an improved helicopter including a skid landing gear assembly in which the vertical stiffness of at least one cross member is decoupled from the longitudinal stiffness, such that the longitudinal stiffness of that cross member may be optimized independently of the vertical stiffness.

It is another objective of the present invention to provide an improved helicopter including a skid landing gear assembly in which at least one cross member has a geometrical cross-section for which the moment of inertia about a vertical axis is not equal to the moment of inertia about a horizontal axis, thereby allowing optimization of the ground resonance frequency placement, while retaining optimum vertical stiffness characteristics for landing energy attenuation and long fatigue life.

It is another objective of the present invention to provide an improved helicopter having a skid landing gear in which at least one cross member has a geometrical cross-section for which the moment of inertia about a vertical axis is not equal to the movement of inertia about a horizontal axis, thereby inherently increasing the efficiency of the cross-section for vertical bending, and reducing fatigue stresses during normal helicopter operation.

It is another objective of the present invention to provide an improved helicopter having a skid landing gear in which at least one cross member has a geometrical cross-section having composite material that is distributed within the cross-section, such that the vertical stiffness is not equal to the horizontal stiffness, thereby allowing optimization of the ground resonance frequency placement, while retaining the optimum vertical stiffness characteristics for landing energy attenuation and long fatigue life.

It is another objective of the present invention to provide an improved helicopter including a skid landing gear assembly in which the skid landing gear optimizes the placement of ground resonance frequency without the use of rocker beams, dampers, or skid springs.

It is another objective of the present invention to provide an improved helicopter including a skid landing gear assembly having mounting devices for mounting cross members of the skid landing gear assembly to the helicopter, the mounting devices forming a selected angle with the helicopter, such that the directional stiffnesses of the cross members are de-coupled from each other.

It is another objective of the present invention to provide an improved helicopter including a skid landing gear assembly having mounting devices for mounting cross members of the skid landing gear to the helicopter, the mounting devices de-coupling the directional stiffnesses of the cross members from each other, thereby allowing the use of circular- or symmetric-section cross members.

It is another objective of the present invention to provide an improved helicopter including a skid landing gear assembly having an attachment means for attaching a cross member of the skid landing gear assembly to a skid member of the skid landing gear assembly, such that the directional stiffnesses of the cross member are de-coupled.

The above, as well as, additional objectives, features, and advantages of the present invention will become apparent in the following detailed description.

BRIEF DESCRIPTION OF THE DRAWINGS

FIG. 8A is a data table of various natural frequencies associated with certain rocker-link angles for the rocker links in FIG. 7.

FIG. 8B is a plot of various curves of natural frequency vs. rocker-link angle for the data in the data table of FIG. 8A.

FIG. 9 is right side view of a mounting device for mounting a cross member of a skid landing gear assembly to a helicopter according to the present invention.

FIG. 10 is a cross-sectional view of the mounting device of FIG. 9 taken at X—X.

FIG. 13 is a perspective view of another mounting device for mounting a cross member of a skid landing gear assembly to a helicopter according to the present invention.

FIG. 14 is a cross-sectional view of another mounting device utilizing elastomers for mounting a cross member of a skid landing gear assembly to a helicopter according to the present invention.

DETAILED DESCRIPTION OF THE PREFERRED EMBODIMENT

Description of Stiffness De-Coupling and Installation

Inherent in helicopter skid landing gear assemblies are certain physical properties, including directional stiffnesses: translational stiffness along three coordinate axes, and rotational stiffnesses about the three coordinate axes. As used herein, helicopter refers to all aircraft having a rotor turning in a horizontal plane. Depending upon its configuration, a particular skid landing gear assembly will have certain predetermined frequency responses to force inputs in these six degrees of freedom. Traditionally, skid landing gear assemblies have been designed for the primary purpose of attenuating the vertical energy transferred to the skid landing gear during landing. For skid landing gear assemblies in which the cross members are circular tubes, this means that once the required vertical stiffness is determined for the cross member, translational stiffnesses in the longitudinal and transverse directions are fixed, as are the rotational stiffnesses about the coordinate axes. In other words, for skid landing gear assemblies in which the cross members have symmetric cross-sections, the vertical stiffness is inherently coupled to the longitudinal stiffness. Of course, adjustments to the stiffnesses in the other directions, are possible, but not without the addition of add-on devices, such as rocker beams, dampers, and skid springs.

In the design of skid landing gear assemblies, two physical properties are of particular importance: the vertical stiffness and the longitudinal stiffness. As used herein, the terms "vertical stiffness" and "longitudinal stiffniess" will refer to only the linear, or elastic, portion of the load vs. stroke curves of cross members, because this is the region in which skid gear function during normal helicopter operation. The vertical stiffness is important because it defines the elastic portion of the non-linear load vs. stroke curve required to attenuate landing energy. In addition, vertical stiffness has a direct influence on fatigue life. The longitudinal stiffness is important because it is a primary source of frequency response to ground resonance frequency. The vertical energy attenuation characteristics of skid gears are defined by the load vs. stroke curves of the cross members as explained in more detail below with respect to FIG. 18. Energy attenuation of hard landings is represented by the non-linear, or inelastic, portion of the curves shown in FIG. 18. For these reasons, the present invention focuses on designing a skid landing gear assembly such that the directional stiffnesses are de-coupled from each other, and in particular, the vertical stiffniess is de-coupled from the longitudinal stiffness.

Figure 19:
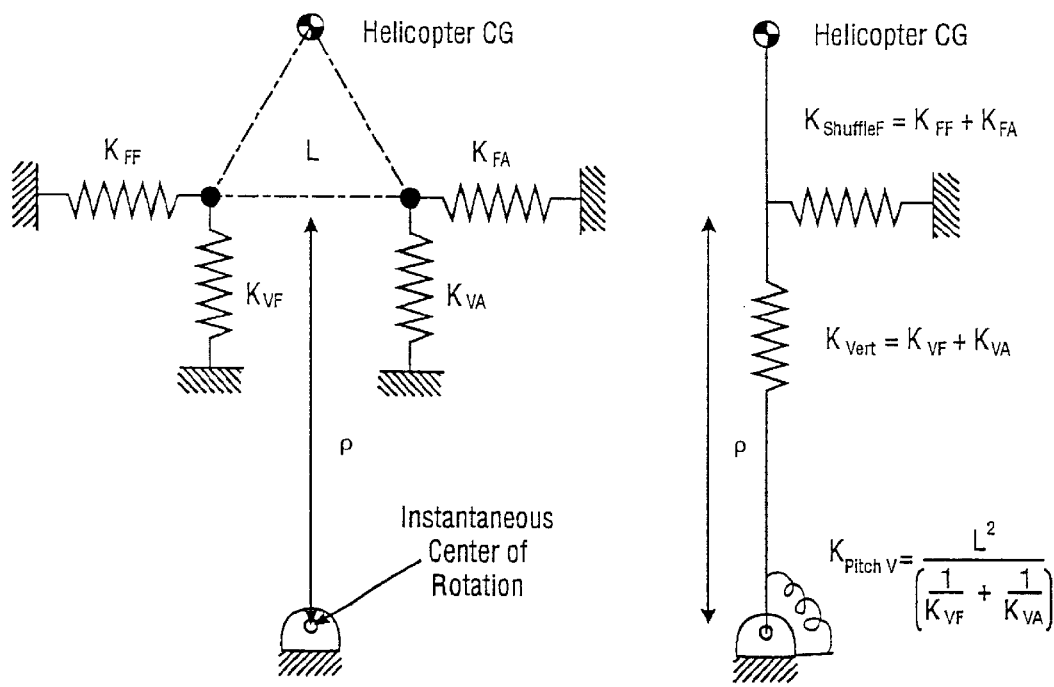
FIG. 19 illustrates the influence of directional stiffness on the fore and aft shuffle mode of ground resonance.

Referring to FIG. 19 in the drawings, how the effective stiffnesses influence the equivalent stiffniess for the pitch mode of ground resonance for a skid type landing gear is illustrated. A similar treatment can be shown for the roll frequency of the landing gear assembly. The effective directional stiffness is a function of the geometry or shape, cross-section, and the cross-sectional material of the landing gear cross member. The effective vertical stiffness ($K_{VF}$ and $K_{VA}$) is designed by the energy attenuation needs and the fatigue life requirements of the landing gear. On the other hand, the effective longitudinal stiffness ($K_{LF}$) and roll/lateral stiffness ($K_{LA}$) are defined by the ground resonance avoidance requirements. The equivalent stiffness and the equivalent mass of the system determine its natural frequency placement. The equivalent stiffness is the overall system stiffness, which is a combination of the effective directional stiffnesses of individual components of the system. For example, in the vertical-longitudinal plane, the equivalent stiffness for pitch mode is a combination of the effective vertical and effective longitudinal stiffnesses of each cross member. The distance from the mount plane to the instantaneous center of rotation, or Pivot Center ρ, is a function of the relative relationship between $K_{PitchV}$ and $K_{ShuffleF}$. Consider the following:

$$\lim_{(K_{PitchV}\to 0)} \rho = 0$$

$$\lim_{(K_{ShuffleF}\to 0)} \rho = \infty$$

Thus the equivalent system pitch stiffness is:

$$K_{Pitch}(eq.) = K_{PitchV} + K_{ShuffleF} \times \rho^2$$

and the ground resonance frequency is directly proportional to the root of the equivalent pitch stiffness:

$$f_{Pitch} \propto \sqrt{K_{Pitch}(eq.)}$$

Prior art coupled $K_{PicthV}$ and $K_{ShuffieF}$ through a cross-sectional geometry constraint, i.e., the $K_{PitchV}$ is defined by the effective vertical stiffness and the $K_{ShuffleF}$ is fixed due to the symmetry in cross-section. The present invention allows $K_{PitchV}$ and $K_{ShuffleF}$ to be de-coupled in stiffness, thereby optimizing the energy attenuation requirements and the ground resonance requirements independently. These effective directional stiffnesses can be tuned either by varying the cross-section and/or material distribution within the cross-section, or by providing compliance through the attachment means.

If a cross member of a skid landing gear assembly has a non-symmetric geometrical cross-section, and/or a non-symmetric distribution of composite material within the cross-section, then the effective vertical stiffness of the cross member will be de-coupled from the effective longitudinal stiffness of the cross member and the rotational stiffnesses of the cross member. In other words, if the effective stiffness of the cross-section with respect to a horizontal axis is not equal to the effective stiffness of the cross-section with respect to a vertical axis, the vertical stiffness of the cross member will be de-coupled from the longitudinal stiffness of the cross member. This means that these stiffnesses can be preselected by varying only the geometrical properties of the cross-section and/or material stiffness properties. Thus, for certain materials, by selectively dimensioning the geometrical cross-section and/or selectively distributing composite material within the cross-section of a cross member, the vertical stiffness and the longitudinal stiffness of the cross member may be independently determined, and the need for additional add-on devices, such as rocker beams, dampers, and skid springs can be eliminated.

Figure 1:
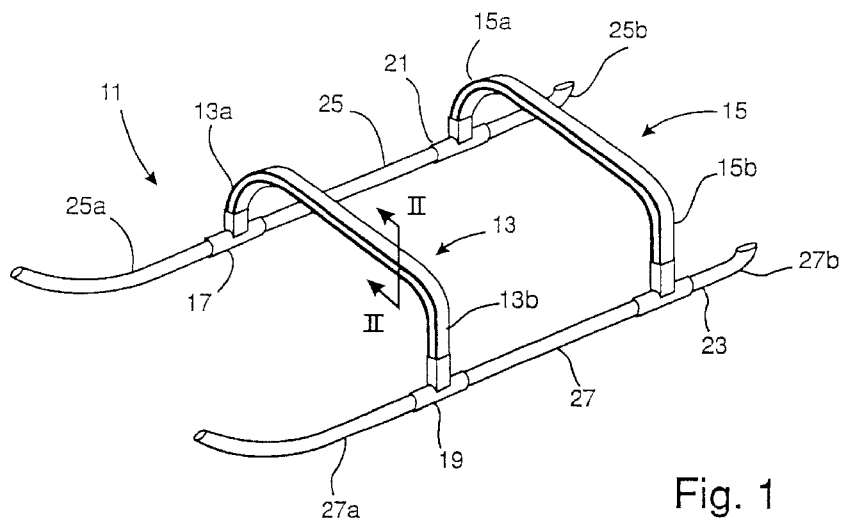
FIG. 1 is a perspective view of an improved skid landing gear assembly according to the present invention.

Referring now to FIG. 1 of the drawings, numeral 11 illustrates the preferred embodiment of an improved helicopter skid landing gear assembly of the present invention. Skid landing gear assembly 11 includes a plurality of generally U-shaped cross members 13 and 15, preferably a pair, that are generally parallel to each other. Cross member 13 is a forward cross member, and cross member 15 is an aft cross member. Forward cross member 13 has a first leg 13a and a second leg 13b. First leg 13a and second leg 13b are downturned and terminate at attachment means 17 and 19, respectively. Aft cross member 15 has a first leg 15a and a second leg 15b. First leg 15a and second leg 15b are downturned and terminate at attachment means 21 and 23, respectively. Attachment means 17 attaches first leg 13a of forward cross member 13 to a first skid member 25, and attachment means 19 couples second leg 13b of forward cross member 13 to a second skid member 27. Attachment means 21 attaches first leg 15a of aft cross member 15 to first skid member 25, and attachment means 23 attaches second leg 15b of aft cross member 15 to second skid member 27. First skid member 25 is preferably a conventional, tubular landing gear ski& having an upturned forward end 25a, and a shorter, less upturned aft end 25b. In an identical fashion, second skid member 27 is preferably a conventional, tubular landing gear skid having an upturned forward end 27a, and a shorter, less upturned aft end 27b. First skid member 25 and second skid member 27 are generally parallel to each other, and parallel to a longitudinal axis (see 37 in FIG. 2) of the helicopter.

It is preferred that legs 13a and 13b of forward cross member 13 taper inwardly near attachment means 17 and 19, in a manner such that legs 13a and 13b maintain the same geometrical cross-sectional shape, but have smaller cross-sections. Likewise, it is preferred that legs 15a and 15b of aft cross member 15 taper inwardly near attachment means 21 and 23, in a manner such that legs 15a and 15b maintain the same geometrical cross-sectional shape, but have smaller cross-sections. As seen in FIG. 1, forward cross member 13 and aft cross member 15 are not typical tubular cross members; rather both forward cross member 13 and aft cross member have "open" geometrical cross-sections, as opposed to "closed" geometrical cross-sections. As used herein, "open" means that there are no completely enclosed portions within the cross-section, and "closed" means that there is at least one completely enclosed portion, or void space, within the geometrical cross-section. For example, a simple I-beam has an open geometrical cross-section, and a simple rectangular tube has a closed geometrical cross-section. As will be explained below, both open and closed geometrical cross-sections can be either symmetrical or non-symmetrical.

Figure 2:
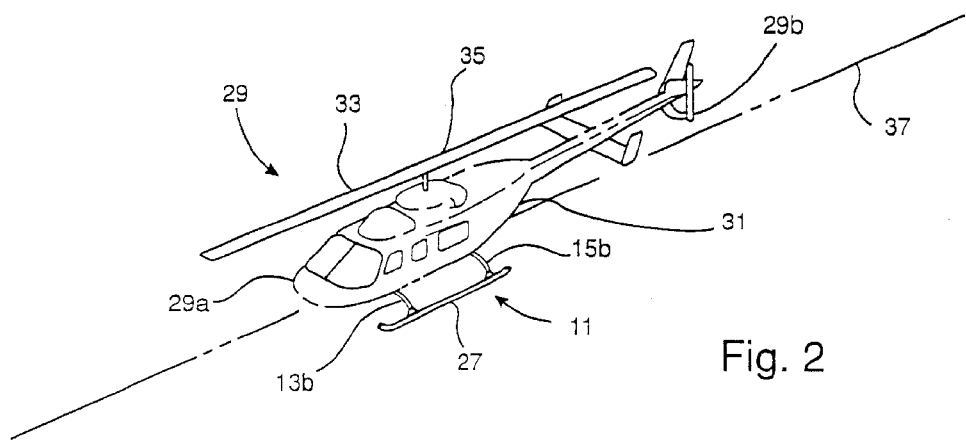
FIG. 2 is a perspective view of an improved helicopter including the skid landing gear assembly of FIG. 1.

Referring now to FIG. 2 in the drawings, an improved helicopter 29 is illustrated. Helicopter 29 is preferably a helicopter having a fuselage 31, a rotor assembly 33 for providing lift and thrust, a drive means 35 carried by fuselage 31 for actuating rotor assembly 33, and skid landing gear assembly 11 for supporting helicopter 29 during landings and while helicopter 29 is not in flight. Helicopter 29 has a longitudinal axis 37 that extends from a forward end 29a of helicopter 29 to an aft end 29b. It should be understood that helicopter 29 may be originally manufactured with skid landing gear assembly 11 included, or helicopter 29 may be an existing helicopter onto which skid landing gear assembly 11 has been installed. In the latter, retrofit, application, it will be apparent that only minor structural modifications, if any, are necessary to install skid landing gear assembly 11 onto existing helicopter 29. As used herein, "mounting devices" and "rocker links" are means for mounting a cross member to fuselage 31 of helicopter 29; and "attachment means" are used to attach cross members to skid members. It should be understood that cross members according to the present invention that inherently include means for de-coupling directional stiffnesses may be mounted to fuselage 31 by either conventional means, or other clamping means.

It should be noted that the method and means of de-coupling the directional stiffnesses of cross members and skid landing gear assemblies explained herein work in conjunction with helicopter 29, in either an original manufacture, or a retrofit mode. For purposes of clarity, helicopter 29 is not shown in all of the figures used to illustrate the de-coupling methods and means described herein. As will be apparent, skid landing gear assembly 11 may be installed onto helicopter 29 such that cross members 13 and 15 are either free to rotate or are restrained from rotation about a lateral axis through each fuselage attachment, depending upon the stiffniess requirements for skid landing gear assembly 1 relative to longitudinal axis 37. It is preferred that the cross-sections taper inwardly toward attachment means 17, 18, 21, and 23 (see FIG. 1).

Description of Open, Non-Symmetric Cross-Sections of Metallic Materials

If a cross member of a skid landing gear assembly has an open, non-symmetric geometrical cross-section comprised of metallic material, then the vertical stiffniess of the cross member will be de-coupled from the longitudinal stiffness of the cross member and the rotational stiffnesses of the cross member. In other words, if the moment of inertia of the cross-section with respect to a horizontal axis is not equal to the moment of inertia of a metallic cross-section with respect to a vertical axis, the vertical stiffness of the cross member will be de-coupled from the longitudinal stiffness of the cross member. This means that either or both stiffnesses can be pre-selected by varying only the geometrical properties of the open, non-symmetric geometrical cross-section. Thus, for metallic materials, by selectively dimensioning the open, non-symmetric geometrical cross-section, the vertical stiffness and the longitudinal stiffness of the cross member may be independently determined, and the need for additional add-on devices, such as rocker beams, dampers, and skid springs can be eliminated. Non-symmetrical cross-sections have greater vertical bending efficiency than symmetrical cross-sections, resulting in higher vertical stiffness and reduced fatigue stress during normal operation, as will be explained in more detail below with respect to FIG. 18.

Figure 3A:
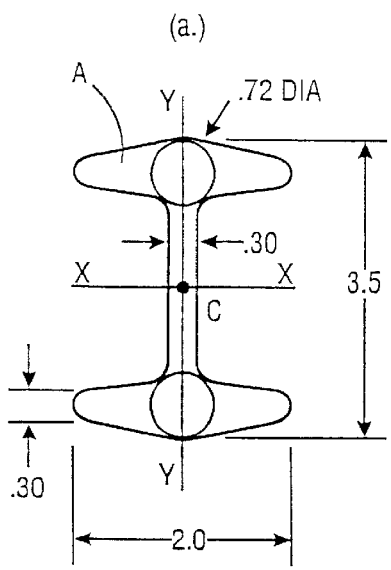
FIGS. 3A–3D are various open, non-symmetric cross-sections of a cross member of the skid landing gear assembly of FIG. 1 taken at II—II.
Figure 3B:
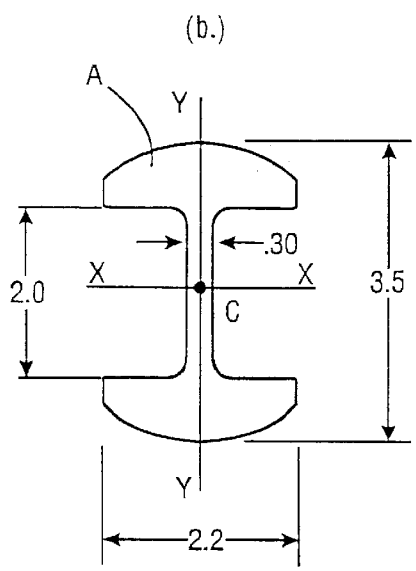
Figure 3C:
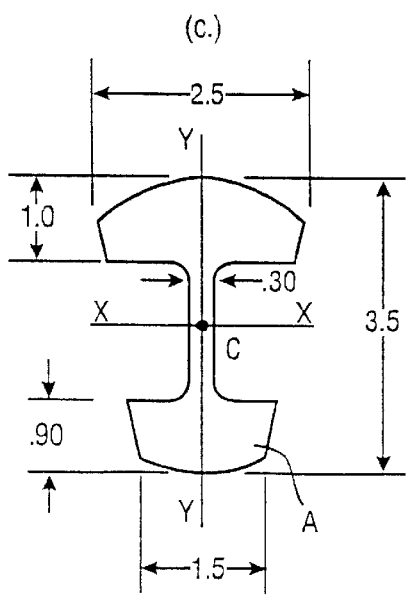
Figure 3D:
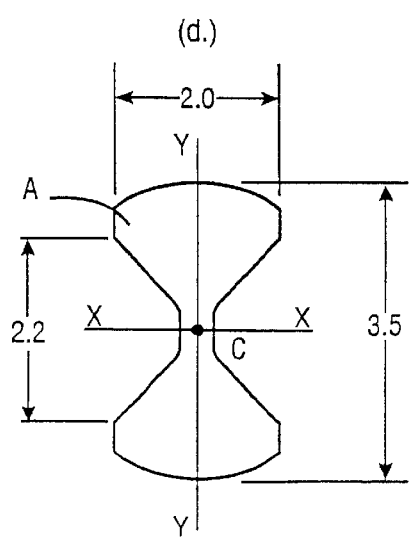

Referring now to FIGS. 3A–3D in the drawings, several open, non-symmetric geometrical cross-sections are illustrated. Any of the cross-sections in FIGS. 3A–3D could represent a cross-sectional view of forward cross member 13 taken at II—II in FIG. 1. In the case of FIG. 3A, forward cross member 13 has a selected open, non-symmetric geometrical cross-section in the shape of an "I." FIGS. 3A–3D are representative of the almost infinite number of open, non-symmetric cross-sections available for use with the present invention. For each cross-section A, a horizontal axis x and a vertical axis y intersect a centroid C. Typical dimensions of open, non-symmetric geometrical cross-sections A are set forth in the figures. Although for most symmetric geometrical cross-sections, such as circles, circular tubes, squares, and square tubes, the moment of inertia of the cross-section with respect to a horizontal axis is identical to the moment of inertia with respect to a vertical axis, such is not the case with open or closed non-symmetric geometrical cross-sections, such as the open, non-symmetric geometrical cross-sections A illustrated in FIGS. 3A–3D. For example, using the dimensions set forth in FIGS. 3A–3D, the moments of inertia $I_{XX}$ of the cross-sections A with respect to horizontal axes x are not equal to the moments of inertia $I_{YY}$ of the cross-sections A with respect to vertical axes y. Because the vertical and longitudinal bending stiffnesses of a metallic cross-section are proportional to the moments of inertia $I_{XX}$ and $I_{YY}$, multiplied by a constant modulus of elasticity E, either or both of the vertical stiffnesses or the longitudinal stiffnesses can be pre-selected by varying the geometrical properties of the open, non-symmetric geometrical cross-sections A. If for example, aluminum having a modulus of elasticity E is used, the cross-sections A in FIGS. 3A–3D have vertical stiffnesses of $EI_{XX}$ and longitudinal stiffnesses of $EI_{YY}$, as set forth in the figures. Thus, by varying the geometrical properties of forward cross member 13 and aft cross member 15, the vertical stiffnesses and the longitudinal stiffnesses can be pre-selected, independent of each other. It is preferred that cross-sections A taper inwardly toward attachment means 17, 18, 21, and 23 (see FIG. 1).

Description of Closed, Non-Symmetric Cross-Sections of Metallic Material

A similar explanation applies to closed, non-symmetrical cross-sections. If a cross member of a skid landing gear assembly has a closed, non-symmetric geometrical cross-section comprised of metallic material, then the vertical stiffness of the cross member will be de-coupled from the longitudinal stiffness of the cross member and the rotational stiffnesses of the cross member. In other words, if the moment of inertia of a metallic cross-section with respect to a horizontal axis is not equal to the moment of inertia of the cross-section with respect to a vertical axis, the vertical stiffness of the cross member will be de-coupled from the longitudinal stiffness of the cross member. This means that either or both stiffnesses can be pre-selected by varying only the geometrical properties of the closed, non-symmetric geometrical cross-section. Thus, for metallic materials, by selectively dimensioning the closed, non-symmetric geometrical cross-section, the vertical stiffness and the longitudinal stiffness of the cross member may be independently determined, and the need for additional add-on devices, such as rocker beams, dampers, and skid springs can be eliminated. As set forth above, non-symmetric geometrical cross-sections have greater vertical bending efficiency than symmetrical cross-sections, resulting in higher vertical stiffniess and reduced fatigue stress during normal operation, as will be explained in more detail below with respect to FIG. 18.

Figure 4A:
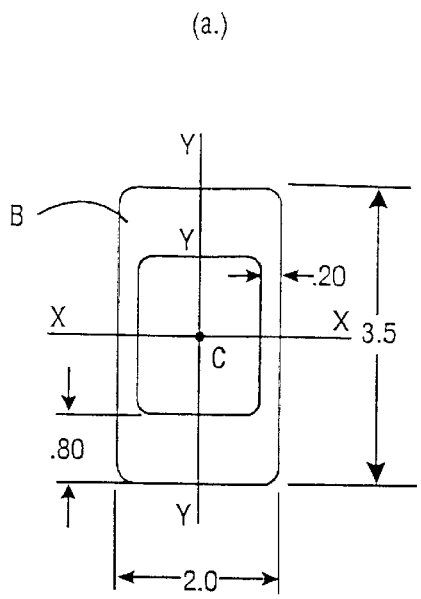
FIGS. 4A—4D are various closed, non-symmetric cross-sections of a cross member of the skid landing gear assembly of FIG. 1 taken at II—II.
Figure 4B:
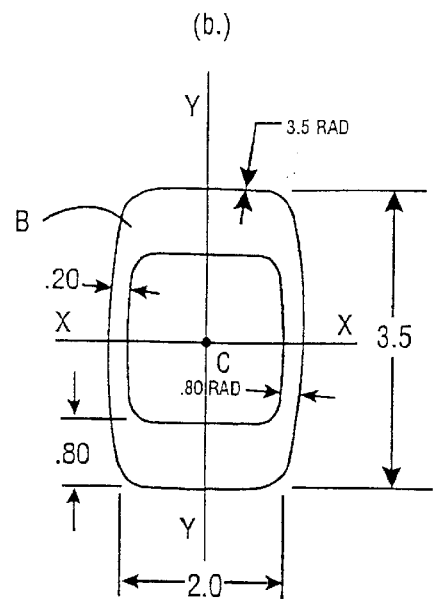
Figure 4C:
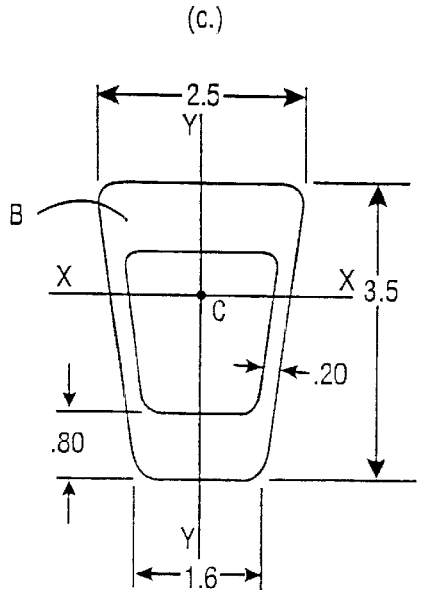
Figure 4D:
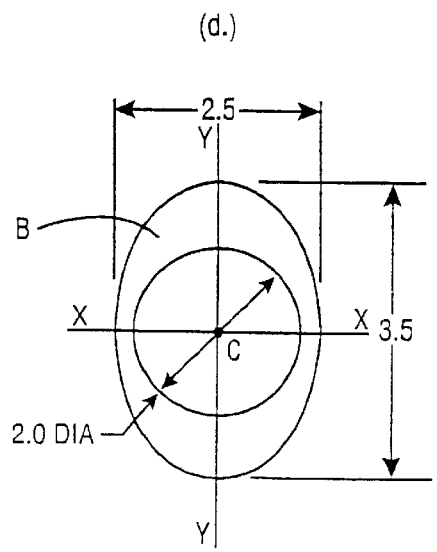

Referring now to FIGS. 4A–4D in the drawings, several closed, non-symmetric geometrical cross-sections are illustrated. Any of the cross-sections in FIGS. 4A–4D could represent a cross-sectional view of forward cross member 13 taken at II—II in FIG. 1. In the case of FIG. 4A, forward cross member 13 has a selected closed, non-symmetric geometrical cross-section in the shape of a rectangular tube. FIGS. 4A–4D are representative of the almost infinite number of closed, non-symmetric geometrical cross-sections available for use with the present invention. For each cross-section B, a horizontal axis x and a vertical axis y intersect a centroid C. Typical dimensions of closed, non-symmetric geometrical cross-sections B are set forth in the figures. Although for most symmetric geometrical cross-sections, such as circles, circular tubes, squares, and square tubes, the moment of inertia of the cross-section with respect to a horizontal axis is identical to the moment of inertia with respect to a vertical axis, such is not the case with open or closed non-symmetric geometrical cross-sections, such as the closed non-symmetric geometrical cross-sections illustrated in FIGS. 4A–4D.

For example, using the dimensions set forth in FIGS. 4A–4D, the moments of inertia $I_{XX}$ of the cross-sections with respect to horizontal axes x are not equal to the moments of inertia $I_{YY}$ of the cross-sections with respect to vertical axes y. Because the vertical and longitudinal bending stiffnesses of a metallic cross-section are proportional to the moments of inertia $I_{XX}$ and $I_{YY}$, multiplied by a constant modulus of elasticity E, either or both of the vertical stiffness or the longitudinal stiffniess can be pre-selected by varying the geometrical properties of the open, non-symmetric geometrical cross-section. If for example, aluminum having a modulus of elasticity E is used, cross-sections B in FIGS. 4A–4D have vertical stiffnesses of $EI_{XX}$ and longitudinal stiffnesses of $EI_{YY}$, as set forth in the figures. Thus, by varying the geometrical properties of forward cross member 13 and aft cross member 15, the vertical stiffnesses and the longitudinal stiffnesses can be pre-selected, independent of each other. As with cross-sections A in FIGS. 3A–3D, it is preferred that cross-sections B taper inwardly toward attachment means 17, 18, 21, and 23 (see FIG. 1).

Description of Closed Symmetrical or Non-Symmetrical Cross-Sections of Composite Materials The de-coupling solutions discussed above generally involve the use of cross members having non-symmetric geometrical cross-sections in metallic skid landing gear assemblies. However, other means of de-coupling the directional stiffnesses from each other are available according to the present invention and will now be discussed. These other means include means in which non-symmetric properties can be obtained for cross members with conventional symmetric or non-symmetric geometrical cross-sections, such as circular and square tubes. If a cross member of a skid landing gear assembly has either a symmetric or non-symmetric geometrical cross-section with a non-symmetric distribution of composite material fiber orientation within the cross-section, then the longitudinal and vertical stiffnesses will not be the simple product of the respective moments of inertia and a constant modulus of elasticity as in the case for a metallic material; rather, the stiffnesses will be the product of the respective moments of inertia and the non-symmetric material modulus distribution for the cross-section. In this manner, the effective vertical stiffness of the cross member will be de-coupled from the effective longitudinal stiffniess of the cross member and the effective rotational stiffnesses of the cross member. In other words, if the effective stiffness with respect to a horizontal axis is not equal to the effective stiffniess with respect to a vertical axis, the vertical stiffness of the cross member will be de-coupled from the longitudinal stiffness of the cross member. This means that these stiffnesses can be pre-selected by varying both the geometrical properties and the composite fiber orientation or distribution within the cross-section. Thus, by choosing certain composite material orientations or distributions and by selectively dimensioning the geometrical cross-section of a cross member, the vertical stiffniess and the longitudinal stiffness of the cross member may be independently determined, and the need for additional add-on devices, such as rocker beams, dampers, and skid springs can be eliminated. As set forth above, non-symmetrical cross-sections have greater vertical bending efficiency than symmetrical cross-sections, resulting in higher vertical stiffness and reduced fatigue stress during normal operation, as will be explained in more detail below with respect to FIG. 18.

Figure 5:
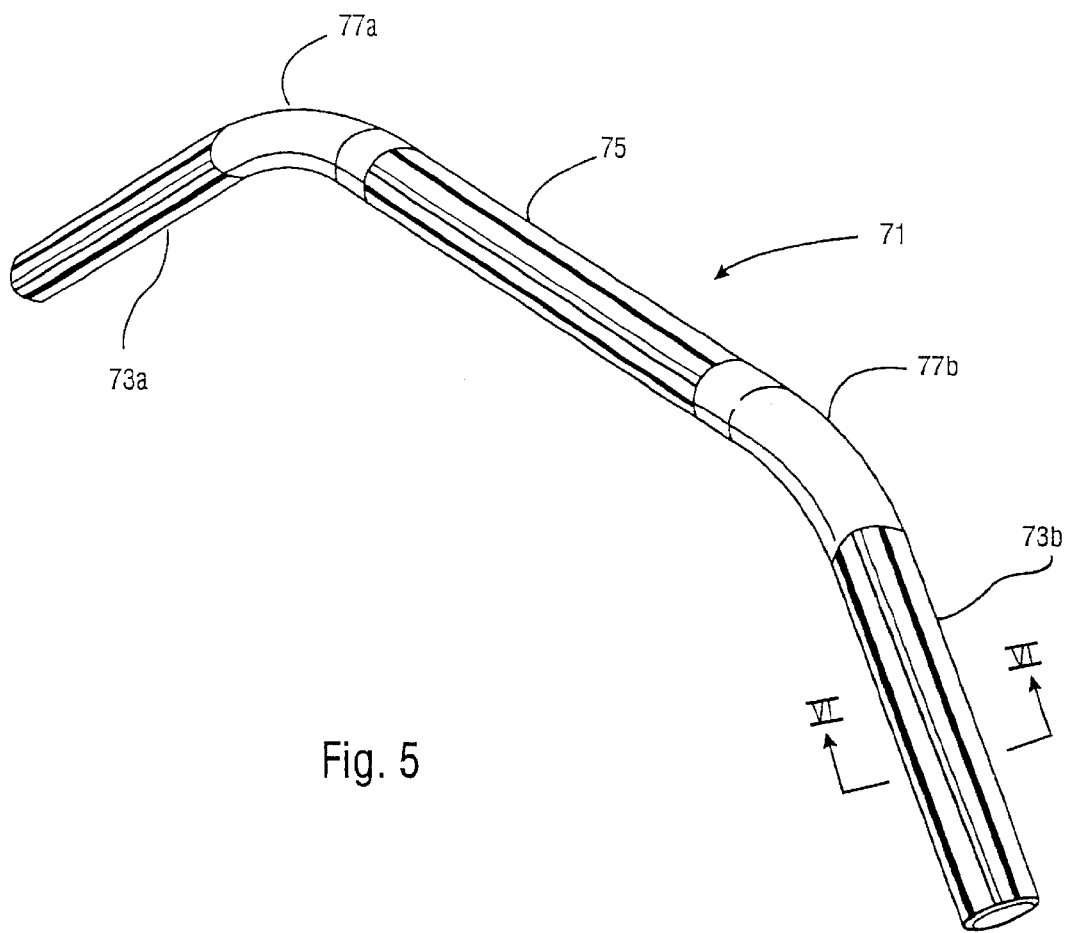
FIG. 5 is a perspective view of a cross member of a skid landing gear assembly according to the present invention, the cross member being made of a composite material and having a closed, symmetric cross-section.

Referring now to FIG. 5 in the drawings, a cross member 71 having either a closed symmetric or non-symmetric geometrical cross-section is shown. Cross member 71 is similar to forward cross member 13 or aft cross member 15. Cross member 71 is generally U-shaped like forward cross member 13, and has leg portions 73a and 73b, similar to leg portions 13a and 13b, a central portion 75, and corner portions 77a and 77b, which join leg portions 73a and 73b to central portion 75. Unlike cross members 13 and 15, it is not necessary that cross member 71 taper inwardly at leg portions 73a and 73b. Leg portions 73a and 73b, and central portion 75, are made of a plurality of composite materials comprised of a fiber-reinforced matrix. Comer portions 77a and 77b are made of a material having sufficient elastic and plastic properties to attenuate the vertical energy of helicopter landings. In this case, corner portions 77a and 77b are made of a metallic material, preferably aluminum. Leg portions 73a and 73b, and central portion 75 behave in an elastic manner only; and thus, will not attenuate landing energy. The attenuation of landing energy is provided by corner portions 77a and 77b. Corner portions 77a and 77b provide the non-linear, plastic behavior capacity for attenuating the vertical energy of hard landings. It should be understood that a great variety of combinations of materials, both composite and metallic, exists that can be selectively tailored to produce specific directional frequency responses to certain directional frequency inputs.

Figure 6A:
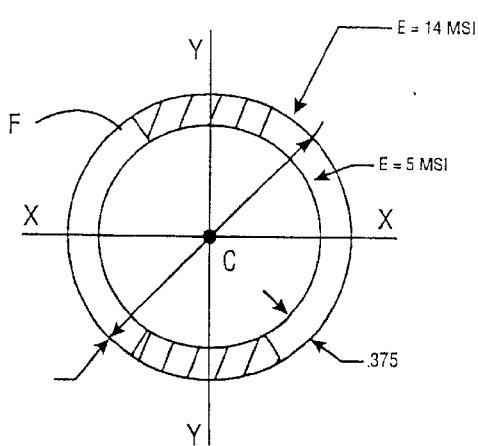
FIGS. 6A—6D are various closed, symmetric and non-symmetric cross-sections of the cross member of FIG. 5 taken at VI—VI.
Figure 6B:
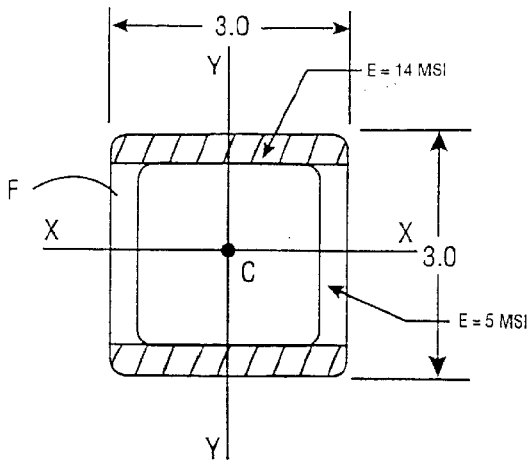
Figure 6C:
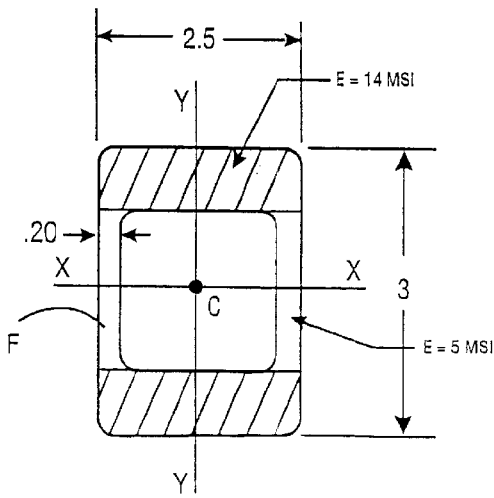
Figure 6D:
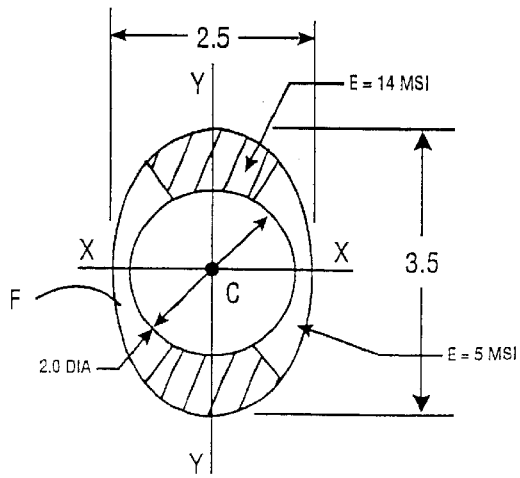

Referring now to FIGS. 6A–6D in the drawings, several closed, symmetric and non-symmetric geometrical cross-sections are illustrated. FIGS. 6A and 6B illustrate closed, symmetric geometrical cross-sections; and FIGS. 6C and 6D illustrate closed, non-symmetric geometrical cross-sections. Any of the cross-sections in FIGS. 6A–6D could represent a cross-sectional view of cross member 71 taken at VI—VI in FIG. 5. Although FIGS. 6A–6D are cross-sectional views taken across leg portion 73b, it should be understood that the following discussion pertains to leg portion 73a and central portion 75 as well. FIGS. 6A–6D are representative of the almost infinite number of closed, symmetric and non-symmetric geometrical cross-sections available for use with the present invention.

For each cross-section F, a horizontal axis x and a vertical axis y intersect at a centroid C. Typical dimensions of the closed, symmetric and non-symmetric geometrical cross-sections F are set forth in the figures. The moments of inertia $I_{XX}$ of the cross-sections F with respect to the horizontal axes x, and the moments of inertia $I_{YY}$ of the cross-sections F with respect to the vertical axes y are set forth in the figures. For each cross-section F, the effective vertical stiffniess is the product of the moment of inertia $I_{XX}$ with respect to the horizontal axis x, multiplied by the distribution of composite modulus of elasticity E within each cross-section F; and the effective longitudinal stiffniess is the product of the moment of inertia $I_{YY}$ with respect to the vertical axis y, multiplied by the distribution of composite modulus of elasticity E within each section. Sample values for effective vertical and effective longitudinal stiffnesses are set forth in the figures.

For most symmetrical cross-sections, such as circles, circular tubes, squares, and square tubes, the moment of inertia of the cross-section with respect to a horizontal axis is identical to the moment of inertia with respect to a vertical axis. However, it should be apparent that although the moments of inertia of cross-sections F in FIGS. 6A and 6B are symmetric, the effective stiffnesses are non-symmetric due to the non-symmetric distribution of composite modulus of elasticity E within each cross-section F. Thus, even with geometrically symmetric cross-sections, non-symmetric vertical and longitudinal stiffnesses can be pre-selected by changing the distribution of composite modulus of elasticity B within each cross-section F. This allows the use of cross members having symmetric geometrical cross-sections where necessary.

Cross-sections F in FIGS. 6C and 6D are geometrically non-symmetric, and thus, have non-symmetric moments of inertia $I_{XX}$ with respect to the horizontal axes x, and moments of inertia $I_{YY}$ with respect to the vertical axes y. Thus, cross-sections F in FIGS. 6C and 6D have non-symmetric effective vertical and longitudinal stiffnesses due to the combined effect of geometry and material non-symmetry. For cross-sections F in FIGS. 6C and 6D, the degree of non-symmetric effective vertical stiffness relative to effective longitudinal stiffniess can be enhanced by combining the effect of non-symmetric moments of inertia with non-symmetric distribution of composite modulus of elasticity E within cross-section F. It should be understood that a great variety of combinations of geometric shapes and composite material orientations and distributions exists that may be selectively tailored to produce specific directional frequency responses to certain directional frequency inputs.

FIGS. 3A–3D, 4A–4D, 5, and 6A–6D illustrate various means of de-coupling directional stiffnesses of skid landing gear assemblies from each other, in particular, de-coupling the vertical stiffness from the longitudinal stiffness purely by selectively altering and independently manipulating the shapes of non-symmetric geometrical cross-section and/or selectively distributing composite material within symmetric and non-symmetric geometrical cross-sections of the cross members. This is possible because the responses to various stresses, strains, and other loads experienced by the cross members are mathematically and physically linked, through well-known mathematical formulas, to the geometrical cross-section of the cross member. Selectively altering the shapes of non-symmetric geometrical cross-sections and/or selectively distributing composite material within symmetric and non-symmetric cross-sections of a cross member to de-couple the directional stiffnesses from each other, represents the simplest and most cost effective means of de-coupling the vertical stiffness from the longitudinal stiffness in a skid landing gear assembly. This method of selectively altering the physical dimensions of the cross-sectional shape and/or selectively distributing composite material within the cross-section allows the user to pre-select is the vertical stiffness and vertical frequency response of the skid landing gear assembly, and independently pre-select the longitudinal stiffness and longitudinal frequency response of the skid landing gear assembly, thereby eliminating the need for add-on devices, such as rocker beams, dampers, and skid springs.

Description of Angled Rocker Links

Another means of stiffness de-coupling in cross members having symmetric or asymmetric geometrical cross-sections is by selectively orienting rocker links to minimize the effects of adverse frequency placement. In response to lateral and longitudinal forces and roll and pitch moments, helicopters, while resting on the ground on their skid landing gear, experience side-to-side roll motion about a longitudinal axis and forward-to-aft pitch motion about a transverse axis. These are the motions in which ground resonance can occur unless properly treated. Associated with each of these rotational motions is a center of rotation and radius of gyration. When rocker links are used to pivotally mount a cross member to a helicopter fuselage, lines of action are created between the contact points of the rocker links with the helicopter fuselage, and the contact points of the rocker links and the cross members. If the rocker links do not have a sufficient inclination, the centers of rotation defined by the intersection of these lines of action will be located at a specific distance beneath or above the helicopter, theoretically approaching infinity for parallel rocker links. This phenomenon produces coupling between the rotational motion and the corresponding translational motion that has significant effects on the inertial properties of the helicopter about the respective centers of rotation, thereby influencing the frequency response of the helicopter when resting on the cross members. Thus, it is desirable to selectively orient the rocker links, preferably in both the transverse and longitudinal planes, such that the centers of rotation are positioned to give the best natural frequency placement relative to ground resonance stability.

Figure 7:
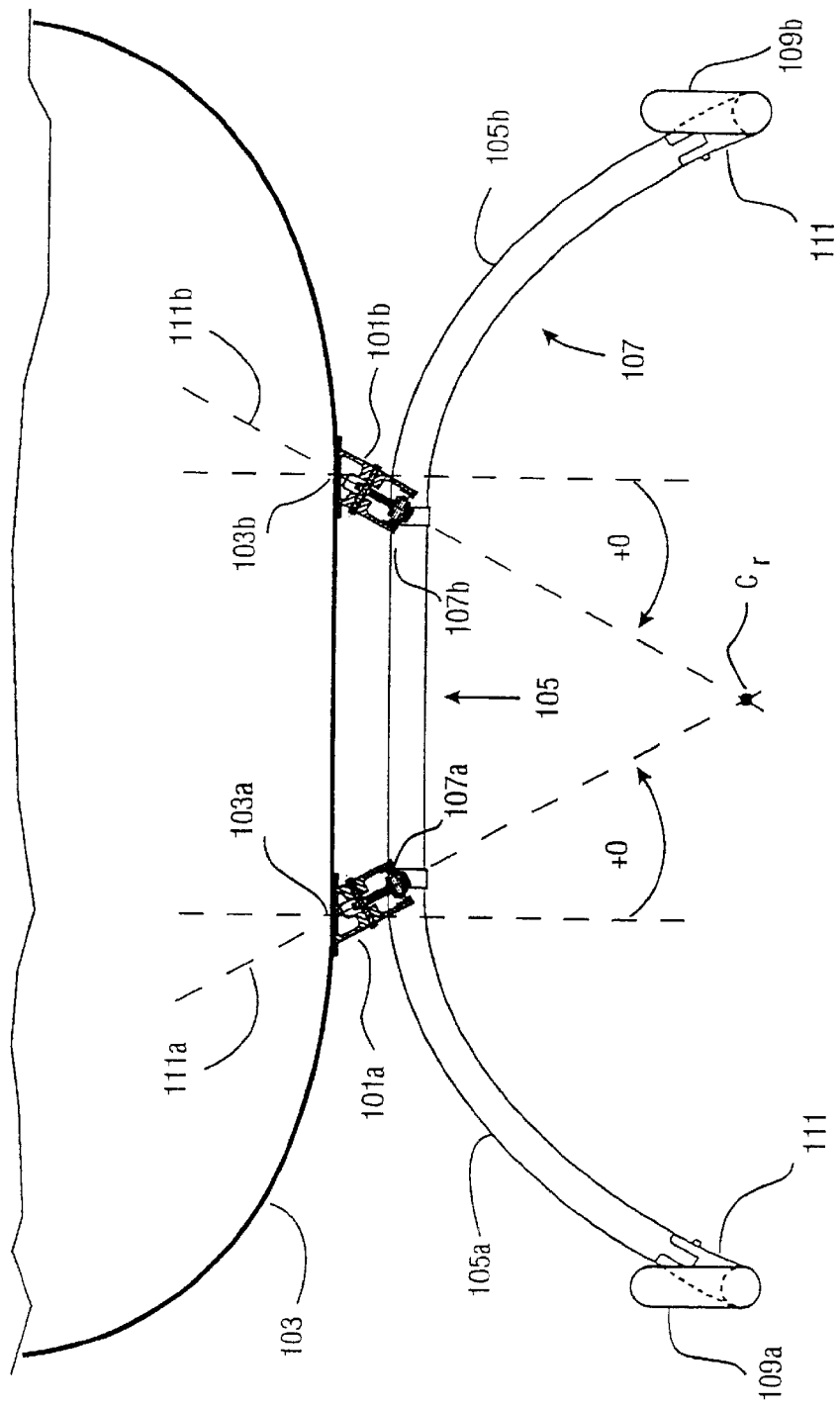
FIG. 7 is a front elevational view of rocker links for mounting a skid landing gear assembly to a helicopter according to the present invention.

Referring now to FIG. 7 in the drawings, a method of selectively orienting rocker links to de-couple the directional stiffnesses provided by a cross member, particularly to de-couple the forward-to-aft stiffness from the side-to-side roll stiffness, is illustrated. A plurality of rocker links 101a and 101b are connected to a helicopter fuselage 103 at connection points 103a and 103b, respectively. Rocker links 101a and 101b are each pivotally coupled to a conventional cross member 105 of a skid landing gear assembly 107. Cross member 105 has a selected forward-to-aft stiffniess and an inherent side-to-side roll stiffniess. Cross member 105 has a generally inverted U-shape and leg portions 105a and 105b. Leg portions 105a and 105b are attached to skid members 109a and 109b by attachment means 111. Rocker link 101a is connected to helicopter fuselage 103 at a point 103a, and to cross member 105 at a point 107a. Likewise, rocker link 101b is connected to helicopter fuselage 103 at a point 103b, and to cross member 105 at a point 107b. A first line of action 111a between helicopter fuselage 103 and cross member 105 may be drawn between points 103a and 107a. Similarly, a second line of action 111b between helicopter fuselage 103 and cross member 105 may be drawn between points 103b and 107b. Both first line of action 111a and second line of action 111b form a rocker link angle θ with the vertical. As is shown, rocker link angle θ is considered positive when rocker links 101a or 101b are inwardly inclined. In addition, rocker link angle θ is considered negative when rocker links 101a or 101b are outwardly inclined.

In this manner, rocker links 101a and 101b form a kinematic focal mechanism. First line of action 111a and second line of action 111b intersect at an center of rotation $C_m$. By locating $C_m$ as close as possible to the horizontal plane bisecting rocker links 101a and 101b, the effects of the side-to-side roll stiffness is maximized, without affecting the forward-to-aft stiffness of cross member 105. Thus, the side-to-side stiffness between the helicopter fuselage 103 and the ground has been de-coupled from the forward-to-aft stiffness of the helicopter fuselage 103 and the ground. De-coupling is achieved merely by the presence of the kinematic mechanism. Varying rocker link angle θ provides for the most advantageous placement of the corresponding natural frequency. It should be understood that this same method can be oriented in the longitudinal plane.

Referring now to FIGS. 8A and 8B in the drawings, sample data for the embodiment of FIG. 7 is illustrated. FIG. 8A is a data table of values of certain natural frequencies, in Hertz, for certain rocker link angles θ, in degrees. FIG. 8B is a plot of natural frequency vs. rocker link angle θ for various natural frequencies set forth in the data table of FIG. 8A. In FIGS. 8A and 8B, it is assumed that an aft cross member is mounted to a helicopter fuselage in the manner shown in FIG. 7, and a forward cross member is mounted to the helicopter fuselage such that the aft cross member is clamped allowing moment transfer across the joint.

FIG. 8B illustrates the effect of rocker link angle θ on various natural frequencies. Separate curves for the following mode shapes are plotted: forward-to-aft, or F/A, 115; vertical 116; pitch 117; lateral roll yaw, or Lat-Roll/Yaw, 118; and roll lateral, or Roll/Lat 119. In the case of lateral roll yaw and roll lateral, the mode shape transfers from a rotation to a translation as the rocker link angle varies. It should be apparent from F/A curve 115, that the natural frequency in the F/A direction is independent of rocker link angle θ. In addition, it should be apparent from vertical curve 116, that the natural frequency in the vertical direction is also decoupled from rocker link angle θ. Also, it should be apparent from pitch curve 117, that the natural frequency in the pitch direction is de-coupled from rocker link angle θ.

As is shown, Lat-RollYaw curve 118 and Roll/Lat curve 119 are sensitive to rocker link angle θ. Because placement of these natural frequencies can result in instability due to the ground resonance phenomenon, certain natural frequencies should be avoided, as indicated by avoid range 521 (see also FIG. 17). Avoid range 521 corresponds to certain rocker link angles θ, or ranges of angles. Avoid range 521 indicates a range of rocker link angles θ that should be avoided when placing the natural frequencies for Lat-Roll/Yaw curve 118 and Roll/Lat curve 119. Avoid range 521 will be explained in detail below with respect to FIG. 17. Thus, it is safe to choose any rocker link angle θ for which the corresponding natural frequency falls outside of avoid range 521.

Description of Mounting Devices

In addition to selectively orienting the mounting devices, another means of de-coupling directional stiffnesses in cross members having symmetric geometrical cross-sections is by using mounting devices that can be tuned to provide specific frequency responses. An example of this is when the mounting device is connected to the helicopter fuselage and the cross member, but the mounting device is tuned to pivot, slide, or rotate in one or more specified directions. Thus, the mounting device, on its own, can be configured to isolate specific inputs and provide appropriate responses, without sacrificing or modifying the directional stiffniess characteristics of the cross member.

Referring now to FIGS. 9 and 10 in the drawings, a mounting device 121 for mounting a symmetric-section cross member 123 to a helicopter fuselage 125 is illustrated. FIG. 9 is a right side view of mounting device 121, and FIG. 10 is a cross-sectional view of mounting device 123 taken at X—X of FIG. 9 (thus, looking forward). Therefore, mounting device 121 represents an aft mounting device on the left-hand side of helicopter fuselage 125. Mounting device 121 allows cross member 123 to move forward, as indicated by arrow F, and aft, as indicated by arrow A. Mounting device 121 includes a base member 127 that is connected to helicopter fuselage 125. Base member 127 has a selected longitudinal orientation with respect to helicopter fuselage 125, thereby forming an angle cc with helicopter fuselage 125. In addition, base member 127 has a selected transverse orientation with respect to helicopter fuselage 125, thereby forming an angle P with helicopter fuselage 125 (see FIG. 10). Angle α is shown here to be about 10°, and angle β is shown here to be about 60°. Base member 127 has two opposing leg portions 129a and 129b that extend away from helicopter fuselage 125, each defining a rigid wall 130a and 130b, respectively. Leg portion 129a is adapted to carry a first upper gimbal 131a, and leg portion 129b is adapted to carry a second upper gimbal 131b. A first rigid link 133a is pivotally connected to first upper gimbal 131a and extends downward generally parallel to wall 130a. Likewise, a second rigid link 133b is pivotally connected to second upper gimbal 131b and extends downward generally parallel to wall 130b. At its downward end, first rigid link 133a is pivotally connected to a first lower gimbal 135a. In a similar fashion, at its downward end, second rigid link 133b is pivotally connected to a second lower gimbal 135b.

First lower gimbal 135a and second lower gimbal 135b are both pivotally carried by opposing ends of a collar member 141 disposed within base member 127. Collar member 141 is a two-part collar having a top portion 141a and a bottom portion 141b. Top portion 141a and bottom portion 141b encircle and releasably fasten cross member 123 to mounting device 121. A plurality of first stop members 143 are attached to the inside of walls 130a and 130b. Likewise, a second plurality of stop members 145 are attached to the inside of walls 147a and 147b, which are perpendicular to walls 130a and 130b of base member 127. First and second plurality of stop members 143 and 145 are preferably elastomeric pads. Thus, first rigid link 133a, collar member 141, and second rigid link 133b pivot about first upper gimbal 131a and second upper gimbal 131b, thereby allowing cross member 123 to translate in the forward and aft directions between stop members 143 on walls 130a and 130b. Also, first rigid link 133a, collar member 141, and second rigid link 133b pivot about first lower gimbal 135a and second lower gimbal 135b, thereby allowing cross member 123 to translate in the side-to-side direction between stop members 145 on walls 147a and 147b. In this manner, mounting device 121 allows cross member 123 limited freedom to translate in selected directions without sacrificing or modifying the stiffness characteristics of cross member 123, thereby de-coupling the lateral and longitudinal stiffnesses from the vertical stiffness of cross member 123.

Figure 12:
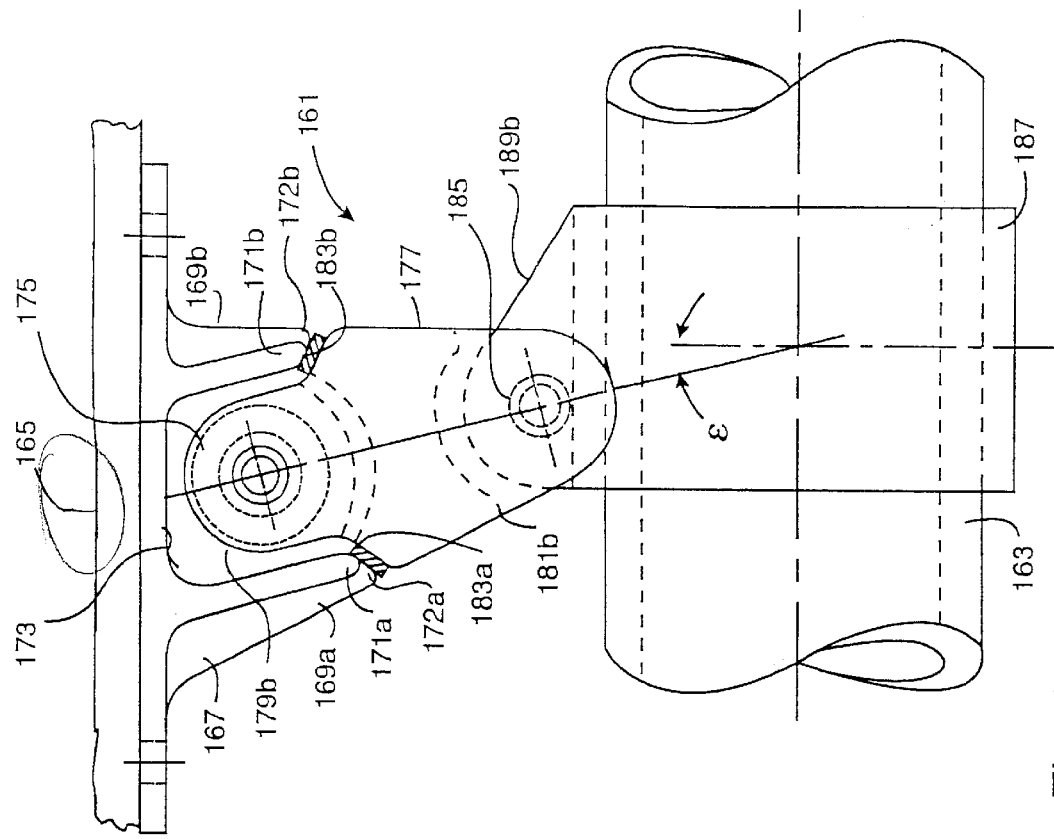
FIG. 12 is a rear elevational view of the mounting device of FIG. 11.
Figure 11:
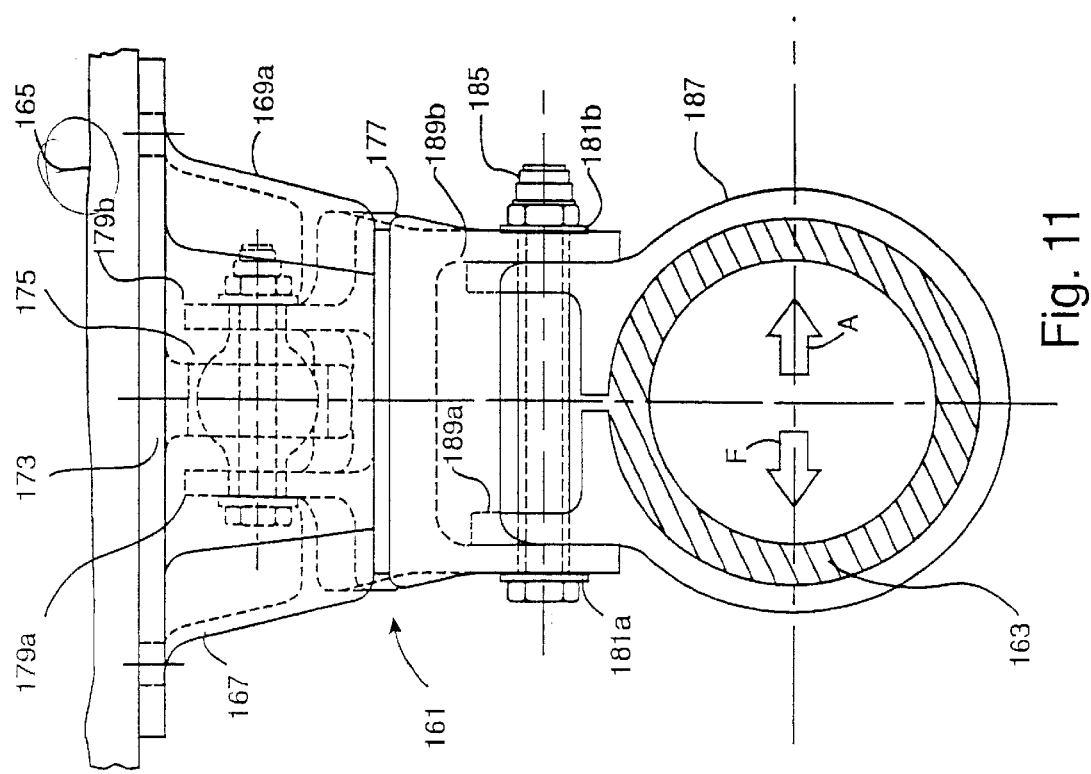
FIG. 11 is a right side view of another mounting device for mounting a cross member of a skid landing gear assembly to a helicopter according to the present invention.

Referring now to FIGS. 11 and 12 in the drawings, a mounting device 161 for mounting a symmetric-section cross member 163 to a helicopter fuselage 165 is illustrated. FIG. 11 is a right side view of mounting device 161, and FIG. 12 is a rear view of mounting device 163. Therefore, mounting device 161 represents an aft mounting device on the left-hand side of helicopter fuselage 165. Mounting device 161 allows cross member 163 to move forward, as indicated by arrow F, and aft, as indicated by arrow A. Mounting device 161 includes a base member 167 that is connected to helicopter fuselage 165. Base member 167 has a selected transverse orientation with respect to helicopter fuselage 165, thereby forming an angle ε with helicopter fuselage 165 (see FIG. 12). Angle ε is shown here to be about 15°. Base member 167 has two opposing leg portions 169a and 169b that extend away from helicopter fuselage 165, each terminating at an inwardly inclined rigid wall 171a and 171b, respectively. Stop members 172a and 172b are connected to inclined walls 171a and 171b, respectively. Stop members 172a and 172b are preferably made of an elastomer, and thus provide a spring function. Base member 167 includes a central leg portion 173 disposed between leg portions 169a and 169b. Central leg portion 173 extends perpendicularly downward from helicopter fuselage 165. Central leg portion 173 is adapted to pivotally carry a gimbal 175.

A rigid link 177 is pivotally connected to gimbal 175 by a pair of upwardly extending parallel upper tabs 179a and 179b. Rigid link 177 extends downward from gimbal 175 generally parallel to leg portions 169a and 169b at angle ε. Rigid link 177 terminates at its lower end with a pair of parallel lower tabs 181a and 181b. Rigid link 177 includes a pair of opposing inclined flanges 183a and 183b located just above the center of rigid link 177. Inclined flanges 183a and 183b slidingly mate with stop members 172a and 172b, respectively. Rigid link 177 pivotally carries a pivot pin 185. A split collar member 187 having upper tabs 189a and 189b securely encircles cross member 163 and is pivotally connected to rigid link 177 via pivot pin 185. In this manner, rigid link 177 may pivot about gimbal 175; however, due to stop members 172a and 172b, rigid link 177 is substantially constrained from motion that is transverse to helicopter fuselage 165. Thus, cross member 163 may rotate about gimbal 175, thereby producing forward and aft movement; and cross member 163 may rotate about pivot pin 185; but cross member 163 is substantially constrained from translational movement relative to helicopter fuselage 165. Rotation of cross member 163 about gimbal 175 allows cross member 163 to be de-coupled in the longitudinal, thereby allowing proper placement of the fore-aft natural frequency relative to ground resonance stability requirements. Rotation of cross member 163 about pivot pin 185 allows cross member 163 to be de-coupled from the side-to-side roll stiffness of helicopter fuselage 165. In this manner, mounting device 161 allows cross member 163 limited freedom to translate and rotate in selected directions without sacrificing or modifying the stiffness characteristics of cross member 163, thereby de-coupling the lateral and longitudinal stiffnesses from the vertical stiffness of cross member 163.

Referring now to FIG. 13 in the drawings, a mounting device 201 for coupling a symmetric-section cross member 203 to a helicopter fuselage (not shown) is illustrated. Mounting device 201 represents an aft mounting device on the left-hand side of the helicopter fuselage. Mounting device 201 allows cross member 203 to slide forward, as indicated by arrow F, and aft, as indicated by arrow A. Mounting device 201 includes a base member 205 that is connected to the helicopter fuselage by conventional fastening means through apertures 207. Base member 205 includes an arcuate slot 207 through which slides an arcuate slider tab 209 of a collar member 211. Arcuate slot 207 is rotated through an angle δ, such that slider tab 209 forms the same angle δ with the helicopter fuselage. Collar member 211 securely encircles cross member 203. Slider tab 209 includes opposing stop flanges 213a and 213b. Stop flanges 213a and 213b restrict the forward-aft sliding of slider tab 209 within arcuate slot 207 of base member 205. In this manner, mounting device 201 allows cross member 203 limited freedom to translate in the forward and aft directions without sacrificing or modifying the stiffness characteristics of cross member 203, thereby de-coupling the lateral and longitudinal stiffnesses from the vertical stiffniess of cross member 203.

Referring now to FIG. 14 in the drawings, a mounting device 301 for mounting a cross member 303 to a helicopter fuselage (not shown) is illustrated. Mounting device 301 represents a mounting device located at any position on the helicopter fuselage. The forward and aft to directions, are indicated by arrows F and A, respectively. Mounting device 301 includes an upper portion 305 and an opposing lower portion 307. Upper portion 305 and lower portion 307 securely encircle cross member 303. Upper portion 305 includes outwardly extending flanges 305a and 305b. Likewise, lower portion 307 includes outwardly extending flanges 307a and 307b. Flanges 305a and 307a, and flanges 305b and 307b, are joined together, respectively, by conventional fastening means (not shown). Upper portion 305 includes an interior, upper recessed portion 309; and lower portion 307 includes a corresponding interior, lower recessed portion 311. Upper recessed portion 309 receives an arched upper spring member 313. In a similar fashion, lower recessed portion receives an arched lower spring member 315. Upper spring member 313 and lower spring member 315 are preferably made from an elastomer. Thus configured, mounting device 301 provides a selected stiffness in the vertical direction, due to the compressive stiffniess of upper spring member 313 and lower spring member 315; but allows twisting in a horizontal plane in the forward direction F and the aft direction A. In addition, upper spring member 313 and lower spring member 315 allow axial motion of cross member 303 in the presence of side-to-side roll forces generated by the helicopter fuselage. In this manner, mounting device 301 allows cross member 303 limited freedom of movement without sacrificing or modifying the vertical stiffness of cross member 303, thereby de-coupling the lateral and longitudinal stiffnesses from the vertical stiffness of cross member 303.

Description of Attachment Means

In addition to selectively distributing composite materials within a cross-section of a cross member, selectively angling rocker links, and using mounting devices that can be tuned to provide specific frequency placement; another means of de-coupling directional stiffnesses in cross members having symmetric geometrical cross-sections is by using attachment means tuned for specific frequency placement to attach the cross members to the skid members. It is often desirable to maintain an existing connection or coupling between a cross member and the helicopter fuselage. In these instances, it is necessary to de-couple the directional stiffness values of the cross member at the connection of the cross member to the skid member.

Figure 16:
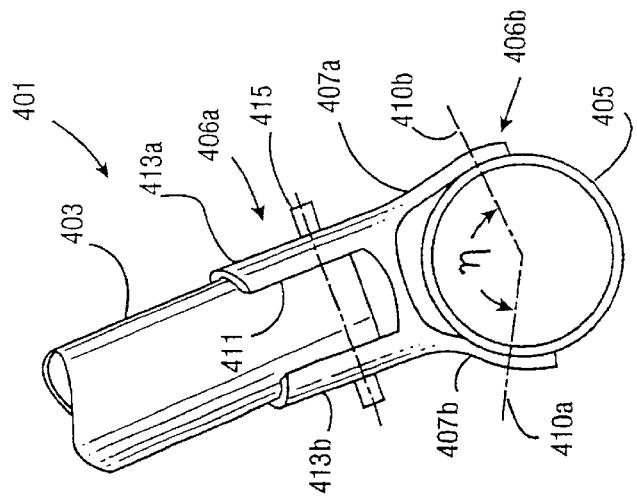
FIG. 16 is a rear elevational view of the attachment means of FIG. 15.
Figure 15:
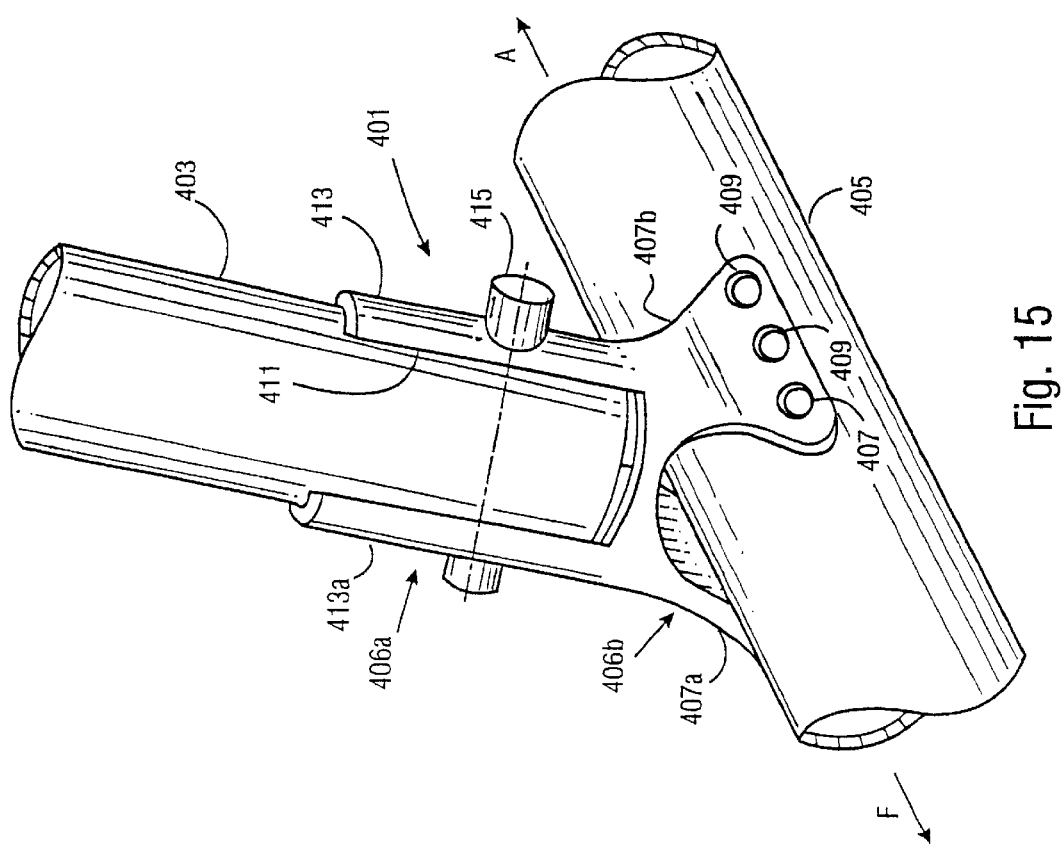
FIG. 15 is a perspective view of an attachment means for attaching a cross member to a skid member in a skid landing gear assembly according to the present invention.

Referring now to FIGS. 15 and 16 in the drawings, an attachment means 401 for pivotally attaching a leg portion 403 of a cross member (not shown) to a skid member 405 is illustrated. In FIG. 15, the forward and aft directions, are indicated by arrows F and A, by respectively. Attachment means 401 is a saddle-type attachment means having an upper portion 406a and a lower portion 406b. Lower portion 406b includes a pair of opposing strap members 407a and 407b that straddle skid member 405. Strap members 407a and 407b are adapted for fastening to skid member 405 by the provision of a plurality mounting apertures 409 located on each strap member 407a and 407b. As shown in FIG. 16, it is preferable that mounting apertures 409 are aligned along axes 410a and 410b that are radial to skid member 405, such that a selected angle η is formed between axes 410a and 410b. It is preferred that angle η be about 150°. Due to the loads experienced by attachment means 401, this alignment of axes 410a and 410b adds strength and stability to attachment means 401. As is shown in FIG. 16, it is preferred that outer strap member 407a be generally aligned with upper portion 406a and leg portion 403 of cross member to provide added stability and strength.

Upper portion 406a is generally a cylindrical tube with a pair of longitudinal slots 411 cut away, leaving a pair of opposing arcuate tabs 413a and 413b extending upwardly. Arcuate tabs 413a and 413b receive leg portion 403 of cross member. Leg portion 403 is releasably and pivotally held between arcuate tabs 413a and 413b by a pivot pin 415. Pivot pin 415 and arcuate tabs 413a and 413b prevent leg portion 403 of cross member from translating in a direction perpendicular to skid member 405. However, because longitudinal slots 411 are aligned with skid members 405, leg portion 403 is allowed to pivot slightly about pivot pin 415 in the forward direction F and aft direction A. In this manner, attachment means 401 allows leg portion 403 of cross member limited freedom of movement without sacrificing or modifying the vertical stiffniess of the cross member, thereby de-coupling the vertical stiffness from other directional stiffnesses of the cross member.

Description of Resultant Placement of Ground Resonant Frequency

Figure 17:
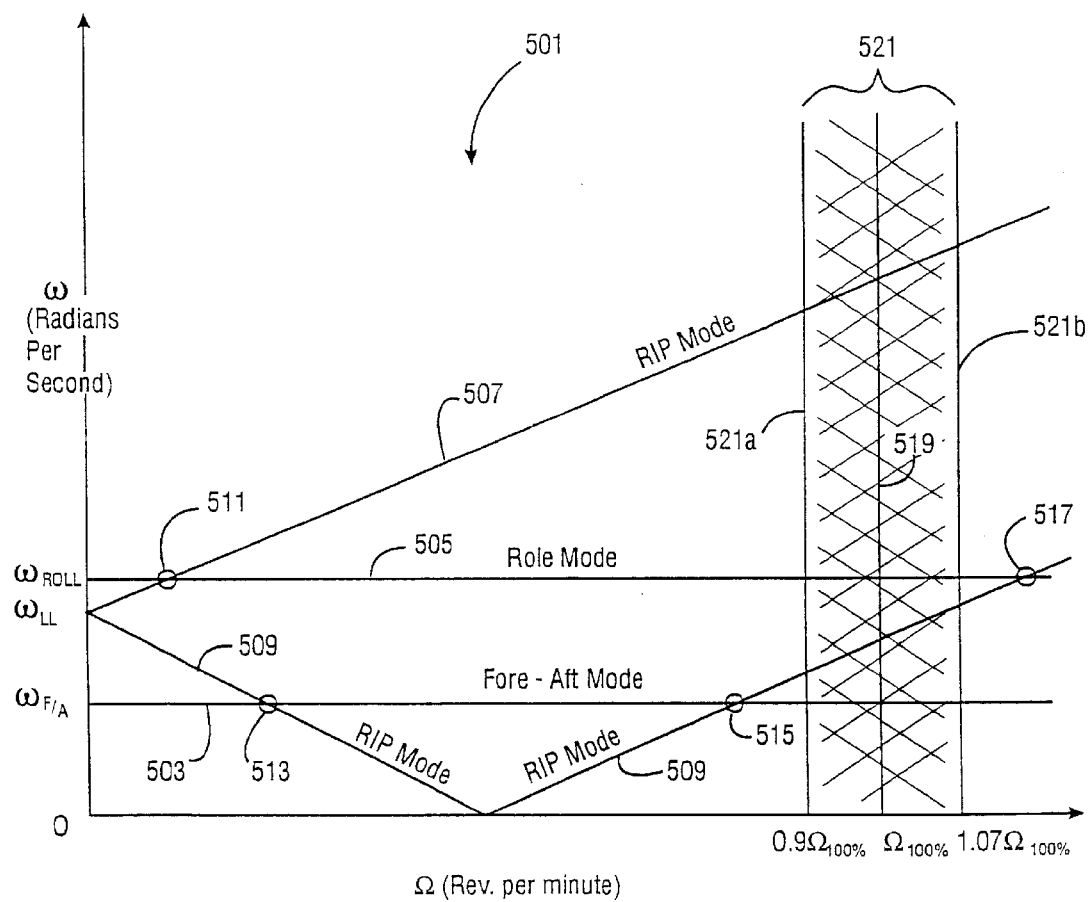
FIG. 17 is a plot of natural frequency vs. rotor blade rotational speed for a helicopter according to the present invention.

Referring now to FIG. 17 in the drawings, a plot 501 of natural frequency, ω, measured in radians per second, vs. rotational speed of the rotor blade, Ω, measured in revolutions per minute, is illustrated as observed from the non-rotating coordinate system. The curves for three natural modes are shown and labeled as follows: the fuselage fore-aft mode (with skids on the ground), sometimes referred to as pitch mode, is labeled as $\omega_{F/A}$; the fuselage roll mode (with skids on the ground) is labeled as $\omega_{ROLL}$; and the main rotor blade lead-lag mode is labeled as $\omega_{LL}$. With the skids on the ground, the fuselage fore-aft mode $\omega_{F/A}$, and the fuselage roll mode $\omega_{LL}$ are independent of the rotational speed of the rotor blade. Thus, the fuselage fore-aft mode $\omega_{F/A}$ is represented by a straight-line curve 503; and the fuselage roll mode $\omega_{LL}$ is represented by a straight-line curve 505. Only the main rotor blade lead-lag mode $\omega_{LL}$ is dependent upon the blade's rotational velocity Ω. Therefore, coLL splits into two separate natural frequencies: $\omega_{LL}+\Omega$, designated as the lead-lag advancing-in-plane mode, or AIP mode; and $\omega_{LL}-\Omega$, designated as the lead-lag regressing-in-plane mode, or RIP mode. The AIP mode is represented by curve 507, and the RIP mode is represented by curve 509. Because it is normal practice to plot only positive values of frequency with the understanding that mirror-image negative values exist, the plot of RIP mode 509 is only represented by positive values.

Points of natural frequency coalescence 511, 513, 515, and 517 exist between the fuselage natural frequencies $\omega_{F/A}$ and $\omega_{ROLL}$, and the lead-lag natural frequencies $\omega_{LL}\pm\Omega$, or AIP and RIP. Points of natural frequency coalescence 511, 513, 515, and 517 occur at the intersections of curves 503, 505, 507, and 509. At points of natural frequency coalescence 511, 513, 515, and 517, some of the rotor blade's rotational energy is transformed to oscillatory energy of the fuselage and of the rotor blade in the in-plane mode. This phenomenon, known in the art as ground resonance, is destabilizing and requires adequate system damping in the fuselage and skids and in the rotor blade and lead-lag dampers. When the system damping is less than or equal to zero, there is a potential for instability.

During operation, a helicopter's main rotor blade has a primary operating rotational speed $\omega_{100\%}$, represented on plot 501 by a curve 519. The main rotor blade typically operates in a rotational speed range from a low end of about $0.9\Omega_{100\%}$ to a high end of about $1.07\Omega_{100\%}$, the operational speed range being represented by 521 on plot 501. The low end of the operational range is represented by a curve 521a, and the high end of the operational range is represented by a curve 521b. Because coalescence of natural frequencies is associated with reduction of system damping, and thus, a potential for instability, it is necessary that selection of the stiffness of the skid gear in the fore-aft direction, selection of stiffness of the skid gear in the roll direction, and selection of the lead-lag natural frequency of the rotor blade $\omega_{LL}$, be made such that points of natural frequency coalescence 511, 513, 515, and 517 are remote from the primary operating rotational speed $\Omega_{100\%}$ of the main rotor blade, and outside operational range 521.

As is shown in FIG. 17, the skid gear fore-aft stiffness should be selected at a low t) enough value such that the natural frequency of the fuselage fore-aft mode $\omega_{F/A}$ and the natural frequency of the RIP mode coalesce below the rotor's normal operational speed range 521. In is other words, point of natural frequency coalescence 515, which represents the intersection of curve 503 and curve 509, should be to the left of curve 521a, thus outside operational speed range 521. In addition, the skid gear roll stiffness should be selected at a high enough value such that the natural frequency of the fuselage roll mode $\omega_{ROLL}$ and the natural frequency of the RIP mode coalesce above the rotor's normal operational speed range 521. In other words, point of natural frequency coalescence 517, which represents the intersection of curve 505 and curve 509, should be to the right of curve 521b, thus outside operational speed range 521.

Description of Resultant De-Coupled Vertical Stiffness

Figure 18:
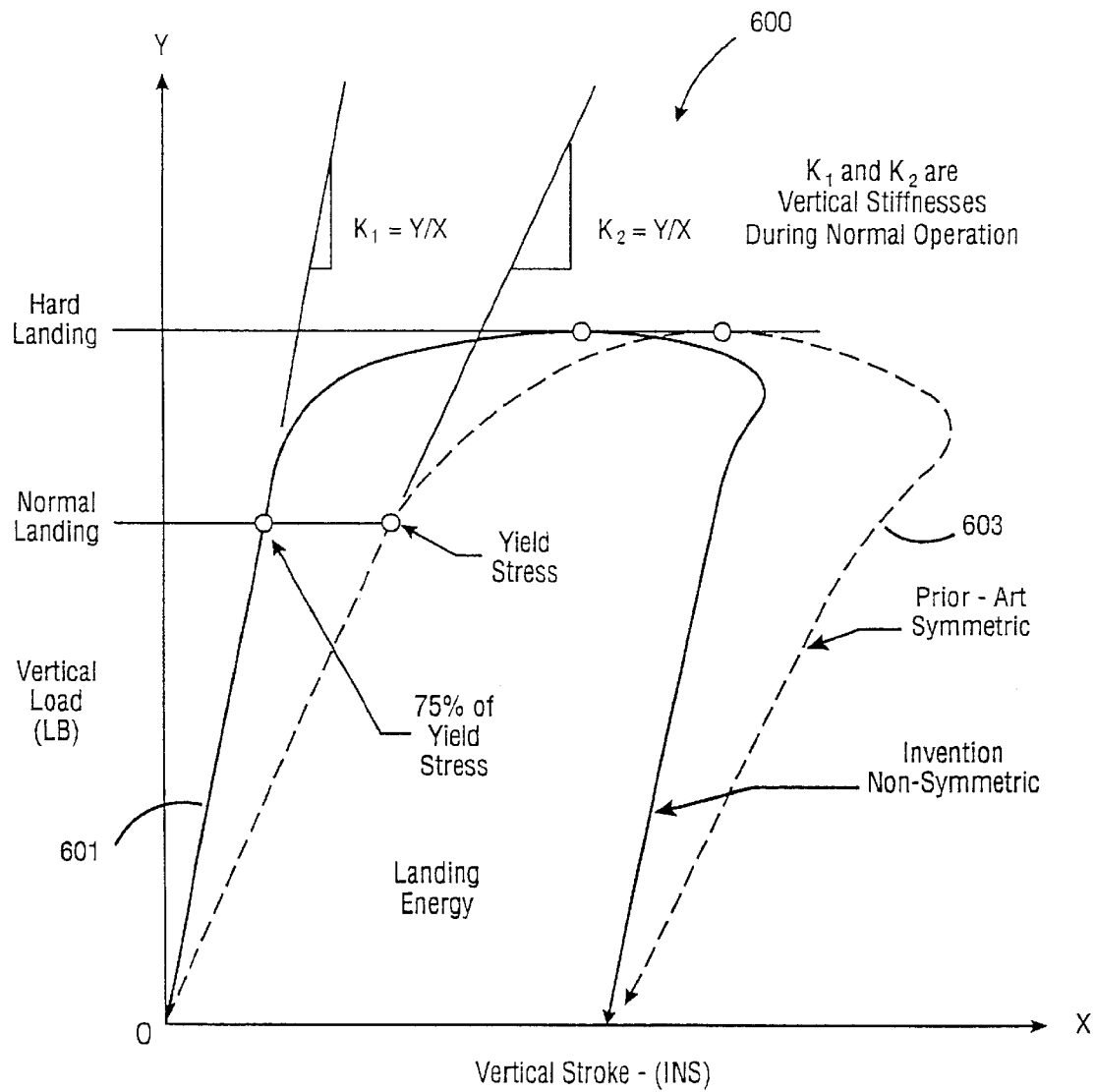
FIG. 18 is a plot of load vs. stroke for a skid landing gear assembly according to the present invention.

Referring now to FIG. 18 in the drawings, a plot 600 of vertical load, in pounds, vs. vertical stroke, or displacement, in inches, for a skid landing gear assembly is illustrated. Such load vs. stroke curves are typical in the art. A curve 601 represents the load vs. stroke curve for a skid landing gear according to the present invention. For comparative purposes, a curve 603 represents a load vs. stroke curve for prior art skid landing gear assemblies (shown in phantom). In a load vs. stroke curve, the linear portion of the curve from the origin to the point of yield represents elastic behavior of the skid landing gear assembly. The remaining portion of the curve represents plastic behavior. As is well known, the integrated area under the curves is the work done, or energy absorbed, by the skid landing gear assembly. It is well known in the art that the attenuation of landing energy comes only from the plastic portion of the curve, not from the elastic portion of the curve.

The vertical stiffnesses during normal operation of a skid landing gear assembly according to the present invention, and of a prior-art assembly are shown as $K_1$ and $K_2$, respectively. In this case, vertical stiffniess $K_1$ is a de-coupled vertical stiffness according to the present invention. It is desirable that the skid gear assembly be stiff in the vertical direction and relatively soft in the longitudinal direction. A high vertical stiffness is represented by a steep curve $K_1$. For a soft longitudinal stiffness, the load vs. stroke curve would have a less steep linear elastic portion. This is possible by employing the methods of de-coupling directional stiffnesses set forth herein.

For prior-art skid landing gear assemblies, normal landings approach the yield stress and push the elastic limits of the skid landing gear assembly. The methods and devices of the present invention provide skid landing gear assemblies with greater bending efficiencies, thereby allowing the skid landing gear assemblies to work at a lower percentage of the yield stress. For example, as is shown, a normal landing for a prior-art skid gear assembly is at or near the yield stress, am whereas a normal landing for a skid landing gear assembly according to the present invention is only about 75% of the yield stress. In a cross member with a non-symmetric cross-section and/or non-symmetric distribution of composite material within the cross-section, a higher vertical stiffniess reduces the applied stresses during normal landings, thus increasing fatigue life. In other words, because the skid landing gear assembly has a greater vertical bending efficiency, fatigue life is also increased.

It should be apparent from the foregoing that an invention having significant advantages has been provided. A skid landing gear for a helicopter has been provided in which the various directional properties, such as stiffness, of the cross members have been de-coupled from each other, thereby allowing individual directional properties of the cross members to be independently optimized. Thus, the vertical stiffness and fatigue life of the cross member may be optimized independently of the longitudinal stiffness of the cross member, resulting in a skid landing gear assembly that is tuned for optimal attenuation of vertical landing energy and for optimal placement for ground resonance stability. The skid landing gear assembly of the present invention eliminates the need for rocker beams, dampers, skid springs, and other add-on devices, resulting in reduced complexity, cost, and weight. While the invention is shown in a limited number of forms, it is not limited to just these forms, but is amenable to various changes and modifications without departing from the spirit thereof.

We claim:

1. A rotorcraft comprising:
    a fuselage;
    a rotor assembly carried by the fuselage;
    a drive means for actuating the rotor assembly;
    a forward cross member coupled to the fuselage;
    an aft cross member coupled to the fuselage; and
    a plurality of skid members coupled to the forward and aft cross members;
    wherein either the forward or aft cross member has a selected cross-section, such that at least ground resonance stability characteristics and vertical energy characteristics can be individually tailored so that the ground resonance stability characteristics and the vertical energy characteristics are not inter-dependent upon each other.

2. The rotorcraft according to claim 1, wherein the selected cross-section of the forward cross member is identical to the selected cross-section of the aft cross member.

3. The rotorcraft according to claim 1, wherein the selected cross-section of the forward cross member is different from the selected cross-section of the aft cross member.

4. The rotorcraft according to claim 1, wherein the selected cross-section of the forward cross member reduces in area near the coupling of the skid members.

5. The rotorcraft according to claim 1, wherein the selected cross-section of the aft cross member reduces in area near the coupling of the skid members.

6. The rotorcraft according to claim 1, wherein the forward cross member is larger than the aft cross member.

7. The rotorcraft according to claim 1, wherein the forward cross member is smaller than the aft cross member.

8. The rotorcraft according to claim 1, wherein the forward cross member is stiffer than the aft cross member.

9. The rotorcraft according to claim 1, wherein the forward cross member is less stiff than the aft cross member.

10. A landing gear assembly comprising:
    a forward cross member adapted for coupling to an aircraft fuselage;
    an aft cross member adapted for coupling to the aircraft fuselage; and
    a plurality of skid members coupled to the forward and aft cross members;
    wherein either the forward or aft cross member has a selected cross-section, such that at least ground resonance stability characteristics and vertical energy characteristics can be individually tailored so that the ground resonance stability characteristics and the vertical energy characteristics are not inter-dependent upon each other.

11. The landing gear assembly according to claim 10, wherein the selected cross-section of the forward cross member is identical to the selected cross-section of the aft cross member.

12. The landing gear assembly according to claim 10, wherein the selected cross-section of the forward cross member is different from the selected cross-section of the aft cross member.

13. The landing gear assembly according to claim 10, wherein the selected cross-section of the forward cross member reduces in area near the coupling of the skid members.

14. The landing gear assembly according to claim 10, wherein the selected cross-section of the aft cross member reduces in area near the coupling of the skid members.

15. The landing gear assembly according to claim 10, wherein the forward cross member is larger than the aft cross member.

16. The landing gear assembly according to claim 10, wherein the forward cross member is smaller than the aft cross member.

17. The landing gear assembly according to claim 10, wherein the forward cross member is stiffer than the aft cross member.

18. The landing gear assembly according to claim 10, wherein the forward cross member is less stiff than the aft cross member.

19. A landing gear assembly comprising:
    a forward cross member adapted for coupling to an aircraft fuselage;
    an aft cross member adapted for coupling to the aircraft fuselage, the aft cross member being identical in size and shape as the forward cross member; and
    a plurality of skid members coupled to the forward and aft cross members;
    wherein the forward and aft cross members have a selected cross-section, such that at least ground resonance stability characteristics and vertical energy characteristics can be individually tailored so that the ground resonance stability characteristics and the vertical energy characteristics are not inter-dependent upon each other.

20. A method of extending the gross weight of a rotorcraft, the method comprising the steps of:
    providing a forward cross member adapted for coupling to the rotorcraft;
    providing an aft cross member adapted for coupling to the rotorcraft;
    providing a plurality of skid members coupled to the forward and aft cross members;
    selecting a geometrical cross-section for either the forward or aft cross member, such that at least ground resonance stability characteristics and vertical energy characteristics can be individually tailored so that the ground resonance stability characteristics and the vertical energy characteristics are not inter-dependent upon each other, thereby eliminating the need for dampers, rocker beams, and cantilevered arcuate supports.

21. A method of influencing the ground resonance stability of a rotorcraft, the method comprising the steps of:
    providing a rotorcraft having a fuselage, a rotor assembly, and a drive means carried by the fuselage for actuating the rotor assembly;

coupling a forward cross member to the fuselage;

coupling an aft cross member to the fuselage;

coupling a plurality of skid members to the forward and aft cross members;

selectively varying the horizontal stiffness of the forward cross member, the aft cross member, and the skid members to alter the ground resonance stability of the rotorcraft.

22. A method of eliminating design conflicts caused by the inter-dependence of landing energy absorption and ground resonance characteristics in a skid landing gear cross member, the method comprising the steps of:

providing a skid landing gear cross member;

providing a selected cross sectional geometry for the skid landing gear cross member such that the horizontal stiffness of the skid landing gear cross member is decoupled from the vertical stiffness of the skid landing gear cross member;

separately tailoring the de-coupled horizontal and vertical stiffnesses, such that an optimal relationship between landing energy absorption and ground resonance characteristics in the skid landing gear cross member is obtained.

23. A method of delaying the onset of metallic plasticity in a skid landing gear cross member during landings of a rotorcraft at very heavy conditions, the method comprising the steps of:

providing a skid landing gear cross member;

providing a selected cross sectional geometry for the skid landing gear cross member such that the horizontal stiffness of the skid landing gear cross member is decoupled from the vertical stiffness of the skid landing gear cross member;

separately tailoring the de-coupled horizontal and vertical stiffnesses, such that a selected absorption of vertical landing energy is obtained, thereby delaying the onset of metallic plasticity in the skid landing gear cross member during landings of the rotorcraft at very heavy conditions.

24. The method of delaying the onset of metallic plasticity in a skid landing gear cross member during landings of a rotorcraft at very heavy conditions according to claim 23, wherein the de-coupled horizontal and vertical stiffnesses are separately tailored such that cross member weight is reduced.

25. A method of improving the fatigue life of a skid landing gear cross member, the method comprising the steps of:

providing a skid landing gear cross member;

providing a selected cross sectional geometry for the skid landing gear cross member such that the horizontal stiffness of the skid landing gear cross member is decoupled from the vertical stiffness of the skid landing gear cross member;

separately tailoring the de-coupled horizontal and vertical stiffnesses, such that any metallic portions of the skid landing gear cross member operate at reduced stress levels during normal operation, thereby improving fatigue life by delaying the onset of metallic plasticity in the skid landing gear cross member during landings of the aircraft at very heavy conditions.

26. A method of reducing the likelihood of yielding of a skid landing gear cross member as a result of hard landings of a rotorcraft during normal operation, the method comprising the steps of:

providing a rotorcraft having a fuselage, a rotor assembly, and a drive means carried by the fuselage for actuating the rotor assembly;

mounting a skid landing gear cross member to the fuselage;

providing a selected cross sectional geometry for the skid landing gear cross member such that the horizontal stiffness of the skid landing gear cross member is decoupled from the vertical stiffness of the skid landing gear cross member;

separately tailoring the de-coupled horizontal and vertical stiffnesses, such that any metallic portions of the skid landing gear cross member operate at reduced stress levels during normal operation, thereby reducing the likelihood of yielding of the skid landing gear cross member as a result of hard landings of the rotorcraft during normal operation.

27. A landing gear assembly comprising:

a plurality of cross members adapted for coupling to a rotorcraft fuselage; and a plurality of skid members coupled to the cross members;

wherein at least one of the cross members has a selected cross-section, such that at least ground resonance stability characteristics and vertical energy characteristics can be individually tailored so that the ground resonance stability characteristics and the vertical energy characteristics are not inter-dependent upon each other.

28. The landing gear assembly according to claim 27, wherein the selected geometric cross-section has a solid form of any external shape, such that no void spaces are present within the selected geometric cross-section.

29. The landing gear assembly according to claim 27, wherein the selected geometric cross-section has a hollow form of any external shape which encompasses a void space of any shape, such that the void shape is included within the selected geometric cross-section.

30. The landing gear assembly according to claim 28, wherein the selected geometric cross-section is symmetric about both of any two mutually perpendicular axes that intersect at the centroid of the selected geometric cross-section.

31. The landing gear assembly according to claim 28, wherein the selected geometric cross-section is non-symmetric about either one or both of any two mutually perpendicular axes that intersect at the centroid of the selected geometric cross-section.

32. The landing gear assembly according to claim 29, wherein the selected geometric cross-section is symmetric about both of any two mutually perpendicular axes that intersect at the centroid of the selected geometric cross-section.

33. The landing gear assembly according to claim 29, wherein the selected geometric cross-section is non-symmetric about either one or both of any two mutually perpendicular axes that intersect at the centroid of the selected geometric cross-section.

34. A landing gear assembly comprising:

a plurality of cross members adapted for coupling to the fuselage; and a plurality of skid members coupled to the cross members;

wherein at least one of the cross members has at least one portion made of a composite material constructed, such that at least ground resonance stability characteristics and vertical energy characteristics can be individually tailored so that the ground resonance stability characteristics and the vertical energy characteristics are not inter-dependent upon each other.

35. The landing gear assembly according to claim 34, wherein the composite material is made of a fiber-reinforced matrix.

36. The landing gear assembly according to claim 34, wherein the at least one of the cross members comprises:
 a central portion made of at least a first composite material;
 a first curved portion connected to one end of the central portion, and a second curved portion connected to the opposing end of the central portion, the first curved portion and the second curved portion each being made of at least one metallic material; and
 a first leg portion connected to the first curved portion, and a second leg portion connected to the second curved portion, the first leg portion and the second leg portions each being made of at least a second composite material.

37. The landing gear assembly according to claim 36, wherein the at least a first composite material and the at least a second composite material are both a fiber-reinforced matrix.

38. The landing gear assembly according to claim 36, wherein the central portion comprises:
 an alternating arrangement of the at least a first composite material and a third composite material; and
 wherein the first leg portion and the second leg portion each comprise:
 an alternating arrangement of the at least a second composite material and a fourth composite material.

39. The landing gear assembly according to claim 38, wherein the at least a first composite material is made of a first fiber-reinforced matrix; and
 wherein the at least a second composite material is made of a second fiber-reinforced matrix.

40. The landing gear assembly according to claim 34, wherein the at least one of the cross members has a geometric cross-section that is symmetric about both of any two mutually perpendicular axes that intersect at the centroid of the geometric cross-section, and a material cross-section that is non-symmetric about either one or both of any two mutually perpendicular axes that intersect at the centroid of the material cross-section.

41. The landing gear assembly according to claim 34, wherein the at least one of the cross members has a geometric cross-section and a material cross-section that are each non-symmetric about either one or both of any two mutually perpendicular axes that intersect at the centroids of the respective cross-sections.

42. The landing gear assembly according to claim 34, wherein the at least one of the cross members comprises:
 a central portion made of at least a first composite material;
 a first curved portion connected to one end of the central portion, and a second curved portion connected to the opposing end of the central portion, the first curved portion and the second curved portion each being made of at least one material for plastically absorbing vertical kinetic energy; and
 a first leg portion connected to the first curved portion, and a second leg portion connected to the second curved portion, the first leg portion and the second leg portions each being made of at least a second composite material.

43. The landing gear assembly according to claim 42, wherein the material for plastically absorbing vertical kinetic energy is a composite material having a composition different than both the first composite material and the second composite material.

44. A landing gear assembly for a rotorcraft comprising:
 a skid gear assembly having a plurality of cross members and a plurality of skid members coupled to the cross members;
 a plurality of rocker links, each rocker link configured to form a selected rocker link angle with the rotorcraft, the upper end of each rocker link being configured for hinged attachment to the rotorcraft, and the lower end of each rocker link being configured for hinged attachment to the skid gear assembly,
 wherein the rocker links are intentionally configured to de-couple at least one directional stiffness from other directional stiffnesses in the landing gear assembly.

45. The landing gear assembly according to claim 44, wherein the at least one directional stiffness is a lateral roll stiffness.

46. The landing gear assembly according to claim 44, wherein the at least one directional stiffness is a longitudinal pitch stiffness.

47. A landing gear assembly comprising:
 a plurality of cross members; and
 a plurality of skid members coupled to the cross members; and
 a plurality of mounting devices configured for mounting to the fuselage of a rotorcraft, each mounting device comprising:
 a base member adapted for attachment to the fuselage;
 a plurality of rigid link members pivotally connected to the base member, whereby pivotal movement of the rigid link members is constrained by the base member; and
 a collar member pivotally coupled to each rigid link member, each collar member being adapted to releasably receive one of the cross members;
 wherein the one cross member may pivotally move relative to the fuselage, whereby the pivotal movement of the one cross member is constrained by the base member, thereby de-coupling at least one directional stiffness from other directional stiffnesses in the landing gear assembly.

48. The landing gear assembly according to claim 47, wherein the base members adapted for attachment to a right side of the rotorcraft are angled toward a left side of the rotorcraft; and
 wherein the base members adapted for attachment to the left side of the rotorcraft are angled toward the right side of the rotorcraft.

49. The landing gear assembly according to claim 47, wherein the base members adapted for attachment to a forward end of the rotorcraft are angled toward an aft end of the rotorcraft; and
 wherein the base members adapted for attachment to the aft end of the rotorcraft are angled toward the forward end of the rotorcraft.

50. The landing gear assembly according to claim 47, wherein the collar member comprises:
 a top portion pivotally coupled to the rigid link members, the top portion encircling at least a portion of the one cross member; and
 a bottom portion encircling a portion of the one cross member, the bottom portion being releasably fastened to the top portion such that the one cross member may be released from the coupling means.

51. The landing gear assembly according to claim 47, wherein the base members adapted for attachment to the right side of the rotorcraft are angled toward the right side of the rotorcraft; and wherein the base members adapted for attachment to the left side of the rotorcraft are angled toward the left side of the rotorcraft.

52. A landing gear assembly comprising:

a plurality of cross members; and a plurality of skid members coupled to the cross members; and a plurality of mounting devices configured for mounting to the fuselage of a rotorcraft, each mounting device comprising:

a base member adapted for attachment to the fuselage; and a collar member slidingly coupled to the base member, the collar member being adapted to releasably receive one of the cross members;

wherein the one cross member may translate in a forward direction and in an opposing aft direction relative to the fuselage, thereby de-coupling at least one directional stiffness from other directional stiffnesses in the one cross member.

53. The landing gear assembly according to claim 52, wherein each mounting device further comprises:

an arcuate slot located in the base member;

an arcuate tab portion adapted to be matingly received by the arcuate slot; and stop flanges located on opposing ends of the arcuate tab portion to limit the translational movement of the arcuate tab portion within the arcuate slot.

54. The landing gear assembly according to claim 52, wherein the arcuate slot and the arcuate tab portion are selectively angled with respect to the base member.

55. A landing gear assembly comprising:

a plurality of cross members; and a plurality of skid members coupled to the cross members; and a plurality of mounting devices configured for mounting the landing gear assembly to the fuselage of a rotorcraft, each mounting device comprising:

a base member configured for attachment to the fuselage, the base member having a semi-circular top section having an interior upper recessed portion;

an opposing semi-circular bottom section having an interior lower recessed portion, the bottom section being releasably connected to the top section;

an upper spring member disposed within the interior upper recessed portion, the upper spring member being adapted to couple the top section to one of the cross members; and a lower spring member disposed within the interior lower recessed portion, the lower spring member being adapted to couple the bottom section to the one cross member;

wherein the upper spring member and the lower spring member allow the one cross member to pivot and translate in a horizontal plane, but restrict the one cross member from translating in a vertical plane, thereby de-coupling at least one directional stiffness from other directional stiffnesses in the one cross member.

56. The landing gear assembly according to claim 55, wherein both the upper spring member and the lower spring member are each made of elastomers.

57. A landing gear assembly comprising:

a plurality of cross members;

a plurality of skid members coupled to the cross members; and a plurality of attachment means for attaching the cross members to the skid members, each attachment means comprising:

a lower section having a plurality of strap members adapted to be coupled to the skid members; and an upper section having a plurality of tab members pivotally coupled to the cross members;

wherein the attachment means allow the cross members to pivot in a forward direction and in an aft direction, but restrict the cross members from translating perpendicular to the skid members, thereby de-coupling at least one directional stiffness from other directional stiffnesses in the cross members.

58. A rotorcraft comprising:

a fuselage;

a rotor assembly carried by the fuselage;

a drive means for actuating the rotor assembly;

a plurality of cross members coupled to the fuselage; and a plurality of skid members coupled to the cross members;

wherein at least one of the cross members has a geometric cross-section that is deliberately selected such that the moment of inertia with respect to a first axis is not equal to the moment of inertia with respect to a second axis that is mutually perpendicular to the first axis;

whereby the directional bending stiffnesses of the at least one cross member are de-coupled from each other, such that the bending stiffness about the first axis varies a particular amount from the bending stiffness about the second axis.

59. The rotorcraft according to claim 58, wherein at least one directional stiffness in at least one of the cross members is a roll stiffness and at least one of the other directional stiffnesses in that cross member is a longitudinal stiffness;

whereby the relationship between the roll stiffness and the longitudinal stiffness is selected such that a vertical response to vertical forces of a landing is not interdependent upon the horizontal response required for ground resonance stability.

60. A landing gear assembly comprising:

a plurality of cross members; and a plurality of skid members coupled to the cross members; and a plurality of mounting devices adapted for mounting the landing gear assembly to a fuselage of a rotorcraft, each mounting device comprising:

a base member adapted for attachment to the fuselage;

a rigid link member pivotally connected to the base member, whereby pivotal movement of the rigid link member is constrained by spring members carried by the base member; and a collar member pivotally coupled to the rigid link member, the collar member being adapted to releasably receive one of the cross members;

wherein the one cross member may pivotally move in a forward direction and in an opposing aft direction relative to the fuselage, whereby the pivotal movement of the one cross member is constrained by the spring members, thereby de-coupling at least one directional stiffness from other directional stiffnesses in the one cross member.

61. The landing gear assembly according to claim 60, wherein each mounting device adapted for mounting to a right side of the fuselage is selectively angled toward a left side of the fuselage; and wherein each mounting device adapted for mounting to the left side of the fuselage is selectively angled toward the right side of the fuselage.

62. The landing gear assembly according to claim 60, wherein the rigid link pivots in a first plane and the collar member pivots in a second plane, the first plane being perpendicular to the second plane.

63. The landing gear assembly according to claim 60, wherein the spring members are made of an elastomer.

64. The landing gear assembly according to claim 60, wherein each mounting device adapted for mounting to a right side of the fuselage is selectively angled toward the right side of the fuselage; and wherein each mounting device adapted for mounting to the left side of the fuselage is selectively angled toward the left side of the fuselage.

\* \* \* \* \*